United States Patent
Hui et al.

(10) Patent No.: US 12,378,007 B2
(45) Date of Patent: Aug. 5, 2025

(54) METHODS AND SYSTEMS FOR GENERATING A MISSION PLAN THAT GUIDES A SPACECRAFT TO ORBITING TARGET OBJECTS

(71) Applicant: The Boeing Company, Arlington, VA (US)

(72) Inventors: Leo H. Hui, Alhambra, CA (US); Haig F. Krikorian, Fullerton, CA (US); Chrysanthie D. Chamis, Palos Verdes Peninsula, CA (US)

(73) Assignee: The Boeing Company, Arlington, VA (US)

( * ) Notice: Subject to any disclaimer, the term of this patent is extended or adjusted under 35 U.S.C. 154(b) by 135 days.

(21) Appl. No.: 18/340,613

(22) Filed: Jun. 23, 2023

(65) Prior Publication Data
US 2024/0425206 A1  Dec. 26, 2024

(51) Int. Cl.
*B64G 1/24* (2006.01)
*B64G 1/10* (2006.01)
(Continued)

(52) U.S. Cl.
CPC .......... *B64G 1/247* (2023.08); *B64G 1/1078* (2013.01); *B64G 1/242* (2013.01); *B64G 1/2427* (2023.08);
(Continued)

(58) Field of Classification Search
CPC ...... B64G 1/247; B64G 1/1078; B64G 1/242; B64G 1/2427; B64G 1/646; G05D 1/683; G05D 1/697; G05D 2109/40
See application file for complete search history.

(56) References Cited

U.S. PATENT DOCUMENTS

| | | | | |
|---|---|---|---|---|
| 5,299,764 A | * | 4/1994 | Scott | G06N 3/008 244/172.5 |
| 11,987,396 B2 | * | 5/2024 | Weiss | B64G 1/6462 |

(Continued)

OTHER PUBLICATIONS

Barbee et al.; Design of spacecraft missions to remove multiple oribital debris objects; 2011 Aerospace Conference, Big Sky, MT, USA, 2011, pp. 1-14 (Year: 2011).*

(Continued)

*Primary Examiner* — Michael J Zanelli
(74) *Attorney, Agent, or Firm* — Harrity & Harrity, LLP

(57) ABSTRACT

An example method executed by a controller onboard a spacecraft generates a mission plan in real-time that guides the spacecraft along a space autonomous mission to rendezvous with two or more orbiting target objects. The method includes establishing potential permutations for all possible unique maneuver sequences in which to visit the two or more orbiting target objects, and for each potential permutation, determining a collision-free maneuver plan for defining orbit trajectories to intercept each of the two or more orbiting target objects for each of the possible unique maneuver sequences. An optimal permutation is determined that meets viewing constraints of the two or more orbiting target objects, a viewing priority, and fuel constraints of the spacecraft. A mission visit plan is generated using the optimal permutation, and the spacecraft executes the plan to rendezvous with and inspect the two or more orbiting target objects.

20 Claims, 18 Drawing Sheets

(51) Int. Cl.

| | |
|---|---|
| *B64G 1/64* | (2006.01) |
| *G05D 1/683* | (2024.01) |
| *G05D 1/697* | (2024.01) |
| *G05D 109/40* | (2024.01) |

(52) U.S. Cl.
CPC ............. *B64G 1/646* (2013.01); *G05D 1/683* (2024.01); *G05D 1/697* (2024.01); *G05D 2109/40* (2024.01)

(56) References Cited

U.S. PATENT DOCUMENTS

| | | | | |
|---|---|---|---|---|
| 2005/0258311 | A1* | 11/2005 | Scott ...................... | B64G 1/646 244/172.4 |
| 2007/0228219 | A1* | 10/2007 | Behrens ............... | B64G 1/4024 244/172.4 |
| 2009/0132105 | A1* | 5/2009 | Paluszek .................. | B64G 1/26 701/13 |
| 2018/0118377 | A1* | 5/2018 | Garber ..................... | G05D 1/02 |
| 2021/0061494 | A1 | 3/2021 | Belieres Montero | |

OTHER PUBLICATIONS

Zavoli et al.; Impulsive Multi-Rendezvous Trajectory Design and Optimization; 8th European Conference for Aeronautics and Space Sciences (EUCASS), Madrid, Spain 2019; pp. 1-15 (Year: 2019).*
A. Baranov, "An algorithm for calculating the parameters of four-impulse transfers between close almost circular orbits," Kosmicheskie Issledovaniia, vol. 24, pp. 400-403, May 1986. (English abstract included).
W. H. Clohessy and R. S. Wiltshire, "Terminal guidance system for satellite rendezvous," Journal of the Aerospace Sciences, vol. 27, No. 9, pp. 653-658, 1960. [Online]. Available: https://doi.org/10.2514/8.8704.
A. Baranov, "An algorithm for calciulating parameters of mult-orbit manuevers in remote guidance," Cosmic Res, vol. 28, No. 1, 1990.
R. Vepa, "Application of the nonlinear tschauner-hempel equations to satellite relative position estimation and control," Journal of Navigation, vol. 71, No. 1, p. 44-64,2018.
R. Reesman and J. R. Wilson, "The physics of space war: How orbital dynamics contrain space-to-space engagements," Oct. 2020.
K. K. Timmons and J. C. Ringelberg, "Approach and capture for autonomous rendezvous and docking," in 2008 IEEE Aerospace Conference, Mar. 2008, pp. 1-6.
L. Sun and W. Huo, "Robust adaptive relative position tracking and attitude synchronization for spacecraft rendezvous," Aerospace Science and Technology, vol. 41, pp. 28-35, 2015, [On-Line].
Alexander Korsfeldt Larsen et al., "A Computationally Efficient Model Predictive Control Scheme for Space Debris Rendezvous", ScienceDirect, IFAC PapersOnLine 52-12 (2019) pp. 103-110.
Yu-heng Shen and Ming-shan Hou, "Adaptive Guidance for Spacecrafts Autonomous Rendezvous with Aspect Contraint", IEEE, 2011.
D. F. Lawden, Optimal trajectories for space navigation. Butterworhs London, 1963.
E. I. Butikov, "Orbital maneuvers and space rendezvous," Advances in Space Research, vol. 56, No. 11, pp. 2582-2594, 2015, [On-Line].
Danylo Malyuta et al., "Advances in Trajectory Optimization for Space Vehicle Control", Annual Reviews in Control, Aug. 2021, pp. 1-100.
Luo Yazhong et al., "Survey of orbital dynamics and control of space rendezvous," Chinese Journal of Aeronautics, vol. 27, No. 1, pp. 1-11, 2014, [On-line].
Yizhai Zhang, et al., "An Angles-Only Navigation and Control Scheme for Noncooperative Rendezvous Operations", IEEE Transactions on Industrial Electronics, vol. 66, No. 11, Nov. 2019, pp. 8618-8627.
X. Yan, S. Chen, M. Xu, Y. Qian, W. Yao, and R. Zhang, "Mission planning of long distance guidance for space rendezvous," in 2009 International Conference on Information Engineering and Computer Science, Dec. 2009, pp. 1-5.
L. Sun, W. Huo, and Z. Jiao, "Adaptive backstepping control of spacecraft rendezvous and proximity operations with input saturation and full-state constraint," IEEE Transactions on Industrial Electronics, vol. 64, No. 1, pp. 480-492, Jan. 2017.
L. Kun, J. Haibo, and L. Fei, "Adaptive backstepping control for spacecraft rendezvous on elliptical orbits," in 2015 34th Chinese Control Conference (CCC), Jul. 2015, pp. 528-532.
R. G. Melton, "Time-explicit representation of relative motion between elliptical orbits," Journal of Guidance, Control, and Dynamics, vol. 23, No. 4, pp. 604-610, 2000. [Online]. Available: https://doi.org/10.2514/2.4605.
T. E. Carter, "State transition matrices for terminal rendezvous studies: Brief survey and new example," Journal of Guidance, Control, and Dynamics, vol. 21, No. 1, pp. 148-155, 1998. [Online]. Available https://doi.org/10.2514/2.4211.
L. Zheng and Y. Jiang, "An improved algorithm to determine the relative attitude during rolling phase of spacecraft rendezvous and docking," in IEEE 10th International Conference on Industrial Informatics, Jul. 2012, pp. 109-112.
K. Yamanaka and F. Ankersen, "New state transition matrix for relative motion on an arbitrary elliptical orbit," Journal of Guidance, Control, and Dynamics, vol. 25, No. 1, pp. 60-66, 2002. [Online]. Available: https://doi.org/10.2514/2.4875.
Antoine Petit et al., "Tracking complex targets for space rendezvous and debris removal application", 2012 IEEE/RSJ International Conference on Intelligent Robots and Systems, Oct. 7-12, 2012, Portugal, pp. 4483-4488.
Bin Zhou et al., "Truncated Predictor Feedback for Periodic Linear Systems with Input Delays with Applications to the Elliptical Spacecraft Rendezvous", IEEE Transactions on Control Systems Technology, vol. 23, No. 6, Nov. 2015, pp. 2238-2250.
Toralf Boge and Ou Ma, "Using Advanced Industrial Robotics for Spacecraft Rendezvous and Docking Simulation", ICRA Communications, 2011 IEEE.
Zhen-Jiang Sun et al., "Uncertainty-Dependent Warning Threshold for Spacecraft Rendezvous Collision Probability", IEEE Transactions on Aerospace and Electronic Systems, vol. 55, No. 1, Feb. 2019, pp. 2-16.
Hiroyuki Takano et al., "Optimal Spacecraft Rendezvous with PNG", 2015 15th International Conference on Control, Automation and Systems (ICCAS 2015) Oct. 13-16, 2015 in Bexco, Busan, Korea, pp. 192-196.
Julia C. Bell, Autonomous Mission Planning for Spacecraft Rendezvous and Proximity Operations, Air Force Institute of Technology, (2021) Theses and Dissertations, 5065.
Jacob Broida and Richard Linares, "Spacecraft Rendezvous Guidance in Cluttered Environments Via Reinforcement Learning", Conference paper, Jan. 2019 [Online] available at: https://www.researchgate.net/publication/331135519_Spacecraft_Rendezvous_Guidance_in_Cluttered_Environments_via_Reinforcement_Learning.
Christopher Karlgaard and Frederick H. Lutz, "Second-Order Relative Motion Equations", Journal of Guidance, Control and Dynamics, vol. 26, No. 1, Jan-Feb. 2003, pp. 41-49.
Lifen Tan et al., "Research on Optimal Strategy of Fixed-Time Rendezvous", 2010 IEEE, pp. 1065-1069.
Huijin Gao et al, "Multi-Objective Robust H Control of Spacecraft Rendezvous", IEEE Transactions on Control Systems Technology, vol. 17, No. 4, Jul. 2009, pp. 794-802.
P.R. Arantes Gilz, "Predictive Control Algorithm for Spacecraft Rendezvous Hovering Phases", 2015 European Control Conference (ECC) Jul. 15-17, 2015, Linz, Austria, pp. 2085-2090.
Edward N. Hartley et al., "Model Predictive Control System Design and Implementation for Spacecraft Rendezvous", Control Engineering Practice 20 (2012) pp. 695-713.
David Sternberg and David Miller, "Mapping a Chaser Satellite's Feasibility Space for Soft Docking", 2017 IEEE, pp. 1-12.
Avishai Weiss et al., "Model Predictive Control for Spacecraft Rendezvous and Docking: Strategies for Handling Constrains and Case Studies", IEEE Transactions on Control Systems Technology, vol. 23, No. 4, Jul. 2015, pp. 1638-1647.

(56) References Cited

OTHER PUBLICATIONS

Edward Hartley, "A Tutorial on Model Predictive Control for Spacecraft Rendezvous", 2015 European Control Conference (ECC) Jul. 15-17, 2015, Linz, Austria, pp. 1355-1361.
Xiangyu Gao et al., A Smoothed Exact Penalty Function Method for the Optimal-Fuel Spacecraft Rendezvous Problem with the Collision Avoidance Constraint, Proceedings of the 11th World Conference on Intelligent Control and Automation, Shenyang, China, Jun. 29-Jul. 4, 2014, pp. 3511-3516.
Ping Lu and Xinfu Liu, "Autonomous Trajectory Planning for Rendezvous and Proximity Operations by Conic Optimization", Journal of Guidance, Control, and Dynamics, vol. 36, No. 2, Mar.-Apr. 2013, pp. 375-389.
James Wertz and Robert Bell, "Autonomous Rendezvous and Docking Technologies —Status and Prospects", SPIE AeroSense Symposium, Paper No. 5088-3, Space Systems Technology and Operations Conference, Orlando, Florida, Apr. 21-25, 2003, pp. 1-11.
Robert N. Lea, "Automated Orbital Rendezvous Considerations", downloaded on Jul. 23, 2022 from IEEE Xplore, pp. 1871-1872.

\* cited by examiner

| Target Id | Priority | Orbit | Inspection |
|---|---|---|---|
| 1 | High | Elliptical | HOT Perch |
| 2 | High | Geo Circular | Football |
| 3 | Medium | Geo Circular | Football |

Status Board For Best Visit Plan 5

| | 3 Op 2 | 1 Op 2 | 2 Op 6 | | Cumulative Metrics | |
|---|---|---|---|---|---|---|
| Target ID in VP Permutation | ◐ | ◐ | ◐ | | | |
| Trajectory ICS | ○ | ○ | ○ | | | |
| ICS | ○ | ○ | ○ | | | |
| HT | ○ | ○ | ○ | | | |
| HOP | ○ | ○ | ○ | | | |
| INSP | FB | PRCH | FB | | | |
| No. of Collision Events | ○ | ○ | ○ | | | |
| Time fail | ○ | ○ | ○ | | | |
| Sun Exp fail Fail | ○ | ○ | ○ | | | |
| Target Metrics Insp Within Tol | 1 | 1 | 1 | | | |
| dV Used (mps) | 1.4 | 875.9 | 474.4 | | dV Used (mps) | 1351.7 |
| dT Used (days) | 8.3 | 7.8 | 5.9 | | dT Used (days) | 22 |
| VP Permutation Score | 101998010 | 1001124100 | 1001525100 | | VP Permutation Score | 2100648210 |

FIG. 12

METHODS AND SYSTEMS FOR GENERATING A MISSION PLAN THAT GUIDES A SPACECRAFT TO ORBITING TARGET OBJECTS

FIELD

The present disclosure relates generally methods and systems executed by a controller onboard a spacecraft to generate a mission plan in real-time that guides the spacecraft along a space autonomous mission to rendezvous and inspect two or more orbiting target objects.

BACKGROUND

On-orbit satellites require servicing over time such as refueling, repairing, and upgrading components of the satellites. To do so, advanced spacecraft are deployed that may include a specialized toolkit and robotic arms for capturing, interacting with, and manipulating a satellite. Servicing of the satellites in use can extend a life of the satellite, and perhaps even repurpose the satellite for other new missions.

SUMMARY

In an example, a method executed by a controller onboard a spacecraft to generate a mission plan in real-time that guides the spacecraft along a space autonomous mission to rendezvous with two or more orbiting target objects is described. The method comprises establishing, for two or more orbiting target objects to visit, potential permutations for all possible unique maneuver sequences in which to visit the two or more orbiting target objects, for each potential permutation, determining a collision-free maneuver plan for defining orbit trajectories to intercept each of the two or more orbiting target objects for each of the possible unique maneuver sequences, and based on the collision-free maneuver plan for each potential permutation, determining an optimal permutation from the potential permutations that meets viewing constraints of the two or more orbiting target objects, a viewing priority, and fuel constraints of the spacecraft. The optimal permutation is further based on an orbit transfer location of the spacecraft and an inspection starting location on the two or more orbiting target objects. The method also comprises generating a mission visit plan, using the optimal permutation, for the spacecraft to rendezvous with and inspect the two or more orbiting target objects, and causing the spacecraft to rendezvous with and inspect the two or more orbiting target objects according to the mission visit plan.

In another example, a method executed by a controller onboard a spacecraft to generate a mission plan in real-time that guides the spacecraft along a space autonomous mission to rendezvous with at least one orbiting target object is described. The method comprises establishing, for at least one orbiting target object to be inspected at two or more inspection points, potential permutations for all possible unique maneuver sequences in which to visit the at least one target object and perform inspections at the two or more inspection points, for each potential permutation, determining a collision-free maneuver plan for defining orbit trajectories to intercept the at least one orbiting target object and perform inspections at the two or more inspection points for each of the possible unique maneuver sequences, and based on the collision-free maneuver plan for each potential permutation, determining an optimal permutation from the potential permutations that meets viewing constraints of the two or more inspection points, a viewing priority, and fuel constraints of the spacecraft. The optimal permutation is further based on an orbit transfer location of the spacecraft and an inspection starting location of the at least one orbiting target object. The method also comprises generating a mission visit plan, using the optimal permutation, for the spacecraft to rendezvous with the at least one orbiting target object and perform inspections at the two or more inspection points, and causing the spacecraft to rendezvous with the at least one orbiting target object and perform inspections at the two or more inspection points according to the mission visit plan.

In another example, an onboard mission controller for a spacecraft is described that comprises a processor, and non-transitory computer-readable media having stored therein instructions, which when executed by the processor, causes the spacecraft to perform functions. The functions comprise establishing, for two or more orbiting target objects to visit, potential permutations for all possible unique maneuver sequences in which to visit the two or more orbiting target objects, for each potential permutation, determining a collision-free maneuver plan for defining orbit trajectories to intercept each of the two or more orbiting target objects for each of the possible unique maneuver sequences, and based on the collision-free maneuver plan for each potential permutation, determining an optimal permutation from the potential permutations that meets viewing constraints of the two or more orbiting target objects, a viewing priority, and fuel constraints of the spacecraft. The optimal permutation is further based on an orbit transfer location of the spacecraft and an inspection starting location on the two or more orbiting target objects. The functions also comprise generating a mission visit plan, using the optimal permutation, for the spacecraft to rendezvous with and inspect the two or more orbiting target objects, and causing the spacecraft to rendezvous with and inspect the two or more orbiting target objects according to the mission visit plan.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, are best be understood by reference to the following detailed description of illustrative examples of the present disclosure when read in conjunction with the accompanying drawings.

FIG. 12 shows an example of a summary status board for the visitation sequence of the example mission, according to an example implementation.

DETAILED DESCRIPTION

Figure 1:
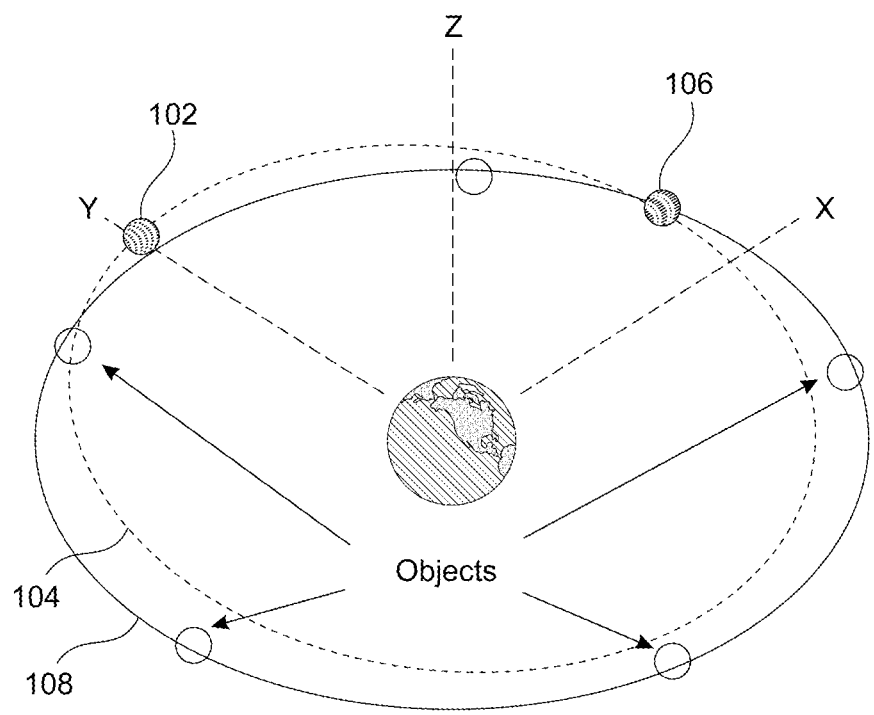
FIG. 1 illustrates an example of multiple orbits and orbiting objects around earth, according to an example implementation.

Disclosed examples are now be described more fully hereinafter with reference to the accompanying drawings, in which examples are shown. Indeed, several different examples may be described and should not be construed as limited to the examples set forth herein. Rather, these examples are described so that this disclosure will be thorough and complete and will fully convey the scope of the disclosure to those skilled in the art.

With an increasing number of high valued satellites to monitor and maintain, near future space inspection missions require automated on-orbit planning and repair solutions. A chaser vehicle or spacecraft will follow a mission plan to guide the spacecraft along a space autonomous mission to rendezvous with the orbiting satellites to perform designated service or maintenance. Autonomy requires determination of a best, collision free, de-conflicted, chaser vehicle inspection plan while handling unexpected impacting situations.

Determining a best visit sequence to on-orbit satellites involves considering a multitude of interdependent orbits, a variety of inspection types and viewing aspects, all while avoiding collisions and meeting mission priorities, mission and viewing constraints and chaser vehicle fuel constraints.

There are many complexities of developing such a mission plan because a number of potential planning options is on the order of (n×m)! where n is a number of satellites to visit and m is a number of orbits, inspection types, maneuver sequences, mission constraints and viewing angles.

Within examples herein, the rendezvous inspection planning is solved as a game where the game searches for and develops a preferred target visit profile sequence. An optimal, collision free, approach, viewing aspect, and visit sequence for each satellite is determined, and timed guidance and pointing vector sequences are generated for the chaser's Guidance Navigation & Control (GNC) system to execute. Examples herein allow processing on the chaser spacecraft to adapt to physical memory and processing restrictions of the chaser spacecraft's processor mission time constraints. The planner also generates metrics that delineate decision steps, optimization justifications, visit types and preferred satellite visit sequence.

As one example, methods and systems are described includes establishing, for two or more orbiting target objects to visit, potential permutations for all possible unique maneuver sequences in which to visit the two or more orbiting target objects, and for each potential permutation, determining a collision-free maneuver plan for defining orbit trajectories to intercept each of the two or more orbiting target objects for each of the possible unique maneuver sequences. Then, based on the collision-free maneuver plan for each potential permutation, methods are executed for determining an optimal permutation from the potential permutations that meets viewing constraints of the two or more orbiting target objects, a viewing priority, and fuel constraints of the spacecraft, and generating a mission visit plan, using the optimal permutation, for the spacecraft to rendezvous with and inspect the two or more orbiting target objects. The chaser spacecraft can then rendezvous with and inspect the two or more orbiting target objects according to the mission visit plan.

Implementations of this disclosure thus provide technological improvements that are particular to computer technology, for example, those concerning evaluating all possible potential permutations for which a spacecraft can visit different orbiting target objects. Computer-specific technological problems, such as selecting a best permutation in real-time, can be wholly or partially solved by implementations of this disclosure. For example, implementation of this disclosure allows for a spacecraft to be programmed to autonomously adapt a maneuver plan in real-time based on changes in spacecraft or other orbiting object positions and velocities.

Referring now to the figures, FIG. 1 illustrates an example of multiple orbits and orbiting objects around earth, according to an example implementation. In FIG. 1, an orbiting target object 102 (e.g., a satellite) orbit the earth in a first orbit 104, and a spacecraft 106 (e.g., chaser vehicle) is launched to intercept and rendezvous with the orbiting target object 102. The spacecraft 106 initially orbits the earth in a second orbit 108. Other orbiting objects are also shown in the first orbit 104 and the second orbit 108.

The physics of space makes planning the rendezvous and inspection of the orbiting target object 102 fundamentally different than planning a similar encounter for objects limited to earth bound travel. Specifically, movement in space is counter-intuitive to that experienced on earth because satellites move fast, move predictably, maneuver slowly, timing is critical, and space is vast. Space-to-space visitation has to be deliberate and the visitation unfolds slowly due to the vast distances as spacecraft can only change their orbits significantly through expenditure of critical δV resources. Orbiting objects have a strict relationship between altitude and speed. Orbits are constrained both in direction and in movement. An orbiting target object generally follows the same path and travels in the same direction without additional propulsive adjustments. These orbital paths can be circular or elliptical and revolve around a center of earth. The relationship between altitude, speed, and orbit therefore makes satellite paths predictable. As a satellite's speed is tied to its altitude, a satellite returns to approximately the same point in its orbit at regular intervals (i.e., a period), regardless of the orbit's shape without a maneuver to change the orbit. Satellites in circular orbits maintain a constant altitude and speed. Elliptical orbits vary in altitude with the satellite traveling slower as it moves toward apogee and faster toward perigee. Mission planning of the spacecraft 106 to intercept the orbiting target object 102 therefore takes advantage of these orbital relationships to minimize fuel to complete the mission.

Mission planning of the spacecraft 106 includes a combination of maneuvers that often transpire over several orbits to change the orbital plane and shape of the spacecraft 106, increasing or decreasing its speed to meet its rendezvous destination time. Predictability in orbit time and motion along with necessary orbital adjustments are leveraged for planning decisions and maneuvers to automate phasing, homing, closing and final approach phases of the spacecraft 106 to intercept the orbiting target object 102 and to develop a preferred visitation sequence for multiple targets.

For mission planning, orbiting target object can be in either a circular or elliptical orbit. In FIG. 1, the spacecraft 106 is in a circular orbit, and the orbiting target object 102 is in an inclined elliptical orbit. The target objects under pursuit can be cooperative or non-cooperative where cooperative in the sense that the target objects maintain their pre-defined orbits and non-cooperative in the sense that the target objects take action to adjust their orbits to minimize an inspection by the spacecraft 106. The spacecraft 106 includes sensors (described below) to obtain updated target object position and velocity states, as well as updated spacecraft states, resource availability (e.g., δV) along with spacecraft health and status. Other orbital objects can also be detected and presented to the spacecraft 106 too.

The ever-changing behavior in all of these variables calls for a solution that incrementally adapts visitation strategy to optimize a coordinated response for the spacecraft 106. In a scenario where the orbiting target objects and the spacecraft 106 have opposing strategies, the orbiting target object would select a strategy $\{s_{tgt_m}^*\}$ from their set of strategies in response to behavior of the spacecraft 106. The spacecraft 106 responds to this change in target behavior and develops a new rendezvous intercept and strategy, $\{s_{ch}^*\}$. These strategies can be thought of as a piecewise continuous graph of best strategies φ (t) in movement by the orbiting target and in optimizing intercept rendezvous planning, inspection technique planning, and visitation order sequencing by the spacecraft summarized by Equation (1).

$$\max:\phi\left(s_{tgt_m}^*, s_{ch}^*\right) \qquad \text{Equation (1)}$$

In general, each of the orbiting target objects and the spacecraft 106 attempts to maximize its outcome at the expense of the other. The spacecraft 106 wants to maximize the encounter by visiting each target as planned. Each orbiting target object moves to limit interaction with the spacecraft. As the environment is time-varying, a state of the encounter evolves over time t∈ [0, T] as summarized in Equation 2 where u (t) ∈ U is the control function for the spacecraft (n) over their set of admissible commands, and similarly the targets control function v (t) ∈ V for each of their members (m), where both U and V are convex sets in the encounter. Interactions of opposing spacecraft and target strategies are played out much like a strategy game, and dynamics of the game x (t) are given by:

$$x(t) = f(x, v_1 \dots v_m(t), u_1 \dots u_n(t))dt \qquad \text{Equation (2)}$$

The spacecraft 106 is therefore faced with finding the sequenced Nash solution set of control functions $\{u_1^*(t) \dots u_n^*(t)\}$ that maximizes the encounter across all targets collectively where φ is the final payoff, and L is the running cost of the encounter.

$$J^u(u, v) = \varphi^u[x(T)] - \int_0^T L^u(x, u(t), v(t), t)dt \qquad \text{Equation (3)}$$

For these controls to be a Nash strategy, inter-dependence of every player's actions (both spacecraft and targets) and resultant system state (x) on the oppositions' behavior are taken into account, thereby making derivation of closed-form algorithms for the encounter extremely complex and time-consuming. Thus, within examples, an adaptive game-based approach is used for developing mission planning.

Figure 2:
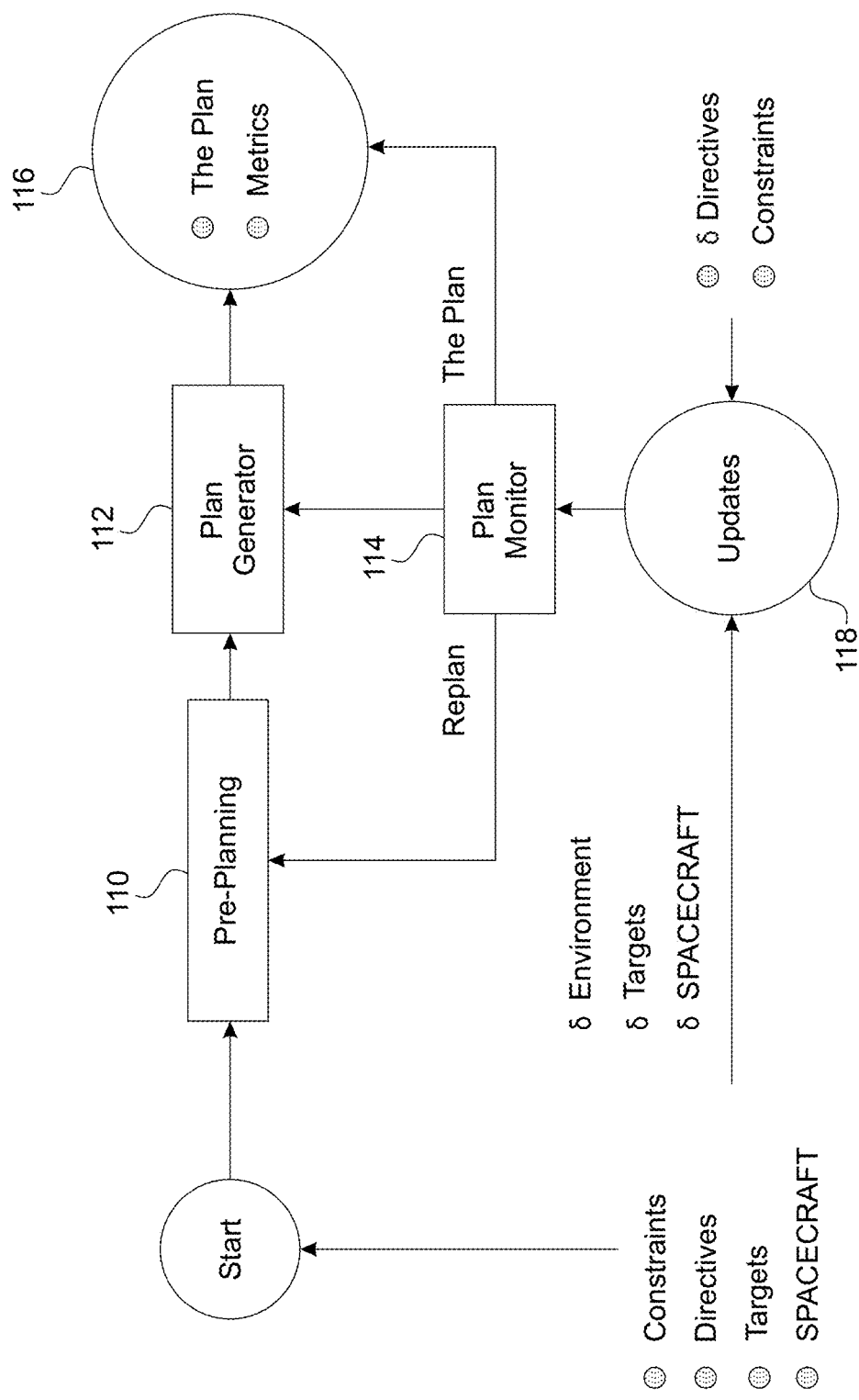
FIG. 2 is a workflow diagram illustrating functions of mission planning, according to an example implementation.

FIG. 2 is a workflow diagram illustrating functions of mission planning, according to an example implementation. Mission planning includes phases of pre-planning 110, a plan generator 112, and a plan monitor 114. Mission planning develops a best visitation sequence for all targets of interest by the spacecraft. A generated plan 116 is sent to the Guidance Navigation & Control (GN&C) sub-system of the spacecraft 106 for execution. A visitation plan for a unique orbiting target object includes generating a best sequence of position, speed, and time delay maneuvers to navigate the spacecraft 106 from a beginning phasing through a final approach phase to meet mission time-lines and inspection requirements. The plan monitor 114 receives updates 118 as to any changes in any variables including environment, target object position or speed changes, spacecraft position and speed changes, etc., in order to modify in real-time the mission plan for successful execution. A mission goes beyond rendezvous with a single target, however. Complexity of visiting multiple targets with an optimal visitation sequence, and autonomous operation with an ability to handle real-time spacecraft, target, and other object status and interaction impacts further supports the need for an adaptive, predictive, game based approach.

Real-time (or real time) describes various operations in computing processes that require response times within a specified time (deadline). A real-time process thus happens in defined time steps of maximum duration and fast enough to affect the environment in which it occurs, such as inputs to a computing system. Real-time responses are often on the order of milliseconds, and sometimes microseconds. A system not specified as operating in real time cannot usually guarantee a response within any timeframe. Real-time processing fails if not completed within a specified deadline relative to an event.

Within examples herein, mission planning establishes, for two or more orbiting target objects to visit, potential permutations for all possible unique maneuver sequences in which to visit the two or more orbiting target objects by the spacecraft. Classical 2-body encounter dynamics are used to determine a best location for the spacecraft to change orbit to intercept an orbit of the target (T) and automate the rendezvous phasing sequences through closing to the target for multiple sequenced spacecraft maneuvers, independent of human interaction.

Figure 3:
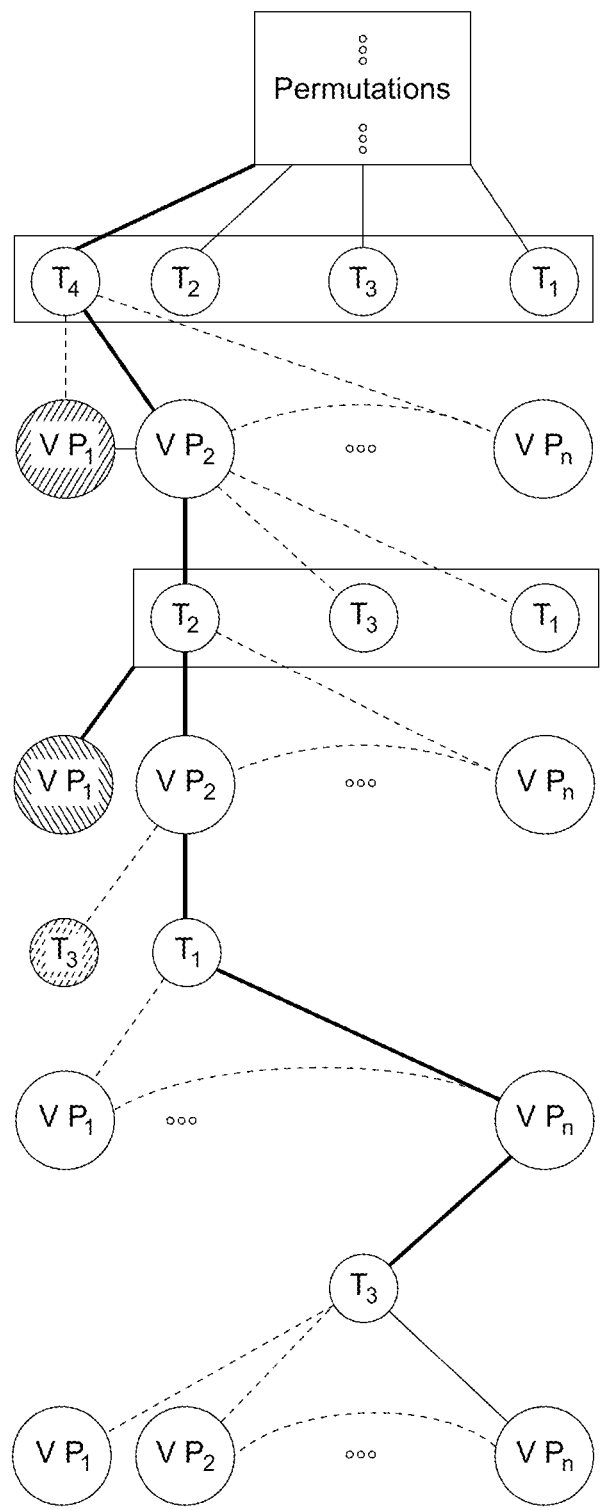
FIG. 3 is an example of a search tree for generating a visitation plan (VP), according to an example implementation.

FIG. 3 is an example of a search tree for generating a visitation plan (VP), according to an example implementation. FIG. 3 depicts a spacecraft (e.g., chaser spacecraft (Ch)) attempting to develop a visitation sequence to four targets ($T_1$, $T_2$, $T_3$, $T_4$). An example permutation has ordered a visit sequence as $Tgt_4 \rightarrow Tgt_2 \rightarrow Tgt_3 \rightarrow Tgt_1$. Starting visitation plan permutations may be pruned by constraints such as mission priority and compliance with mission objectives. Starting visitation plan permutations may also be rejected based on remaining $\delta V$ margins or mission imposed inspection visitation or time constraint compliance.

Traversal of the search tree starts by developing maneuver and inspection sequences for all inspection opposition for $Tgt_4$. FIG. 3 depicts that the first visitation plan $VP_1$ violated constraints and failed, but all the other visitation plans succeeded. The algorithm has selected visitation plan $Ch \rightarrow Tgt_4 | V\ P_2$ as a best option for subsequent target visit plan generation.

For a next target in the permutation, $T_2$, visit plan option one, $VP_1$ failed and after developing all the visit plan options, visit plan option two, $VP_2$ was selected as the best option.

From this point forward, having the plan developed from $Ch \rightarrow Tgt_4 | V\ P_2 \rightarrow Ch \rightarrow Tgt_2 | V\ P_2$, the algorithm planner determined that of the remaining targets, target three $T_3$ was unattainable given ending conditions of a current visitation sequence. The algorithm then backtracks to the permutation that contains $T_1$ as a next target in the sequence and removes from consideration all further permutations containing a $T_4 \rightarrow T_2 \rightarrow T_3$ sequence.

As before, all visitation options are generated and $VP_n$ is selected as the options for $T_1$. For the remaining target in the permutation, $VP_n$ is selected from the options developed for $T_3$. A final visitation plan sequence is given as:

$$Ch \rightarrow Tgt_4|VP_2 \rightarrow Tgt_2|VP_2 \rightarrow Tgt_1|VP_n \rightarrow Tgt_3|VP_n$$

Note that all visit plan options for a target are evaluated as they contain unique maneuver and inspection option sequences specific to a type of inspection required and mission imposed inspection constraints. Once a visitation plan fails, the algorithm backtracks to the parent node, and processing memory of the spacecraft is recovered as a next available option from the parent node is examined. Mission directives may command that subsequent visitation plans are not created after a visit plan has been selected unless backtracking is required.

Should subsequent processing reveal that no additional viable sequences can originate from a selected target, then the algorithm backtracks and selects the next permutation containing the visitation sequence with an alternate next target. All impacted downstream permutations are flagged for deletion. All targets, regardless of the starting point in the search, are kept for potential inclusion in the plan. Each visitation plan is kept for comparison with and selection against other viable plans.

Referring back to FIG. 2, the pre-planning 110 phase has three functional areas, and a main focus of which is to minimize memory and throughput through functions that assemble the original target list, prune the target list from the potential list of over hundreds of targets to those suggested by the ground-based intercept planner. For any given visit plan directive, a maximum number of targets to visit may be set to be less than ten to maintain reasonable scoring metrics. More targets can be visited with addition of another visit plan directive. With the ten targets, a set containing a permutation of all target sequences is generated.

These sequences are the elaborated branches in the planner's search space (e.g., shown in FIG. 3). For an example plan that contains up to nine satellites, a set of permutations contains no more than (9!) entries. This elaboration permits tighter control of memory organization, utilization, and eases processing during backtracking and the subsequent pruning of follow-on permutations on branch failure. Relative kinematics between the spacecraft and the pruned targets are developed. The pre-planner prunes the permuted target sequences that violate mission constraints such as needed to meet schedule and $\delta V$ allocation restrictions. The behavior of these functions are subject to the planning constraints of Table 1 and spacecraft states of Table 2, and target relative kinematic and orientation states.

TABLE 1

| Planning Constraint | Range of Values |
| --- | --- |
| Point of closest approach (POCA) "safety bubble": for planned, free-flight, egress, or emergency egress paths | Range is typically in the tens of km |
| Short fly through of keep-out zones (KOZ) | Temporal length in KOZ; minimizes risk to chaser from faults |
| Propellant reserve for safe disposal | ≈10-15 m/s reserved for GEO graveyard disposal |
| Other mission constraints (margin, power, other sensors, etc.) | Solar panels angle offsets with temporal constraints<br>Battery depth of discharge and power usage<br>Ensure ground communication access |
| Sensor sun exclusion zones | Off bore-sight half angle = 30 (conic) |
| Unplanned conjunctions of free-flight | Satellite Safety bubble |
| SV chaser electromagnetic safety | Target specific inertial KOZ and relative attitude |
| Thruster plume impingement zones | Target specific ingress KOZ, corridor approach relative to target's position and attitude |
| Unplanned disruptions and anomalies | KOZ relative to target |
| Chaser unintentionally interfering with or damaging the target | KOZ relative to target |
| Exceeding chaser maneuvering capabilities translation and slew (6 DOF) | Max slew rates<br>Limit individual maneuver to less than 5-10 m/s at GEO |
| Debris fields | KOZ relative to debris |

TABLE 2

| Variables | Source |
| --- | --- |
| $\delta V$ capacity | Platform initialization |
| $\delta V$ remaining | Platform health & status |
| Min instantaneous $\delta V$ | Platform initialization |

TABLE 2-continued

| Variables | Source |
| --- | --- |
| Effector (thruster/RWA) rates | command rate from GN&C subsystem to effectors, controlled by flight control or bus/platform subsystem |
| Field of view limits | Platform initialization |
| Rotation/attitude rates | Platform initialization |
| Current Health & Status | Platform HSM subsystem |
| Nominal guidance plan | Ground mission computer |
| Attitude | perception subsystem |
| Ground estimated inertial state | Ground mission computer |
| Inertial state onboard | Platform GN&C |
| GN&C update rate | Platform initialization |
| Pointing guidance rate | GN&C I/F to sensor subsystem |
| Translation guidance rate | GN&C subsystem |
| Relative nav update rate | GN&C subsystem |
| Guidance sequence update rate | GN&C subsystem |
| Mission manager rate | Platform initialization |
| Payload sensors update rate | Platform initialization |
| TT&C update rate | Platform initialization |

Mission constraints refer to a number and type of targets to visit and their spacecraft track files, a preferred visitation priority, including the inspection type, the range, the inspection orbit tolerances, the number of revisits, and the allotted $\delta V$ exceptions. Spacecraft perch type inspections, perch stand-off distances and relative positions to the targets are constraints too.

Driving spacecraft vehicle constraints are $\delta V$, schedule and time remaining, and a desired position and attitude relative to a target's orbit. Other constraints govern an ability of the spacecraft to view a target given the encounter dynamics. Target vehicle constraints fall into two categories. A first category is an estimate of the kinematics and attitude relative to the spacecraft. These relative state estimates are developed from an initial state developed by the ground mission computer, a sensor system onboard the spacecraft that tracks objects in its field-of-view, and spacecraft kinematics. A second set of target state variables contain estimates of target orientation, and these estimates are typically handled either by on-board discrimination engines or by other off-board means as are estimates of target physical capabilities.

Referring again back to FIG. 2, the plan is monitored by the plan monitor 114 to both issue the Guidance and Navigation commands to the spacecraft to execute and to examine impact of changes in the following areas: spacecraft capabilities, target orbits, mission constraints and directives, and collision avoidance. The algorithm executed by the spacecraft iterates through the visit sequence list. If the plan is already invoked, then no need to make new plans, unless things have changed. If the spacecraft is in middle of a maneuver plan, nothing is changed. If there is a collision event (CE) or things have changed, then a re-plan is initiated.

Spacecraft vehicle capabilities that impact the generated plan are detected via the on-board Health & Status (H&S) Monitoring (HSM) of the spacecraft's subsystems. Of particular interest are unexpected changes in $\delta V$ and Guidance and Navigation Control (GN&C) effector and Sensor status. Levels of degraded operations defined by HSM establish a policy by which HSM is mapped to specific mission capabilities. Changes in HSM then determine the spacecraft's ability to conduct specific mission maneuvers, rotations, number and types of observations, and available time to accomplish specific target encounters. For changes in H&S, an assessment is conducted for each leg of the developed plan to determine if the plan can continue as is, can be updated to relax specific mission directives with respect to the time available to accomplish the inspection and viewing angle impacts, or whether a target visitation must be rejected and re-planned, or whether the whole plan has to be scrapped and recalculated.

Similar to the multi-levels of degraded operations mentioned above, mission updates are monitored during each leg of the planned visitation sequence to determine the level of impact from changing target specific observation directives. For example, changes in $\delta V$ allotments per target, maneuver type, number of inspections requested, or target priority can cause significant disruptions to the generated plan. A multi-level set of actions based on the type of changes to mission directives guides whether a planned leg is updated or the mission is to be scrapped.

Specific legs of the visitation mission are assessed for a specific target and the algorithm determines if there is sufficient cause to relax the $\delta V$ allocation to accomplish the inspection or whether that leg of the mission should be rejected and re-planned or whether complete mission re-plan is necessary.

In addition, the plan monitor 114 performs collision event detection and avoidance. Objects moving near the spacecraft or onto its trajectory are made known to the spacecraft from both onboard sensor and tracking systems and from ground mission computer inputs. These moving objects include not only impending solid impacts but also ever-moving keep-out zones of debris or other constellations. At any instance, the algorithm has to determine existence of immediate and predicted collision events and determine a collision avoidance method that minimizes $\delta V$ expenditures while developing the visitation sequence plan.

In FIG. 2, the plan generator 112 is divided into four planning tiers. Each tier is designed to address specific nuances of the visitation sequence planning process. The tiers include visitation sequence plan determination, visit permutation plan construction, visit option generation, and visitation option plan construction.

The planning process starts with the set of permuted visit sequences. Each sequence is called a visit permutation. For N targets, there are N! visit permutations. Each visit permutation is a branch in the search space. When the plans for all visit permutations have been constructed, the final selected visit permutation plan is called the visitation sequence plan (or mission visit plan), which is output for execution by the spacecraft.

For each visit permutation plan, the best visitation option for each target in the visitation sequence is determined. These best visitation options are the outcome of ranking multiple visitation options for each target, each with an accompanying rendezvous and inspection plan that varies by orbit transfer location and inspection starting location.

The best visitation option plan is called the target unique visitation plan for the permutation, and includes a timed sequence of spacecraft maneuvers to accomplish the rendezvous and inspection. The maneuvers are generated based on the relative kinematics and orbits between chaser and the target. The multitude of visitation options are set up to generate very different maneuver plans, thereby allowing the autonomous planner the best potential to have a favorable plan that meets mission directives and constraints.

The interdependencies of the target sequence, relative kinematics, orbit dynamics, maneuvers, and inspection options, drove the visit plan permutation set as a guide in the search space in order to lower complexity and housekeeping during backtracking. This action can be taken, in some example, in lieu of normal A* search methodology of generating and evaluating decision branches at run-time.

Figure 4:
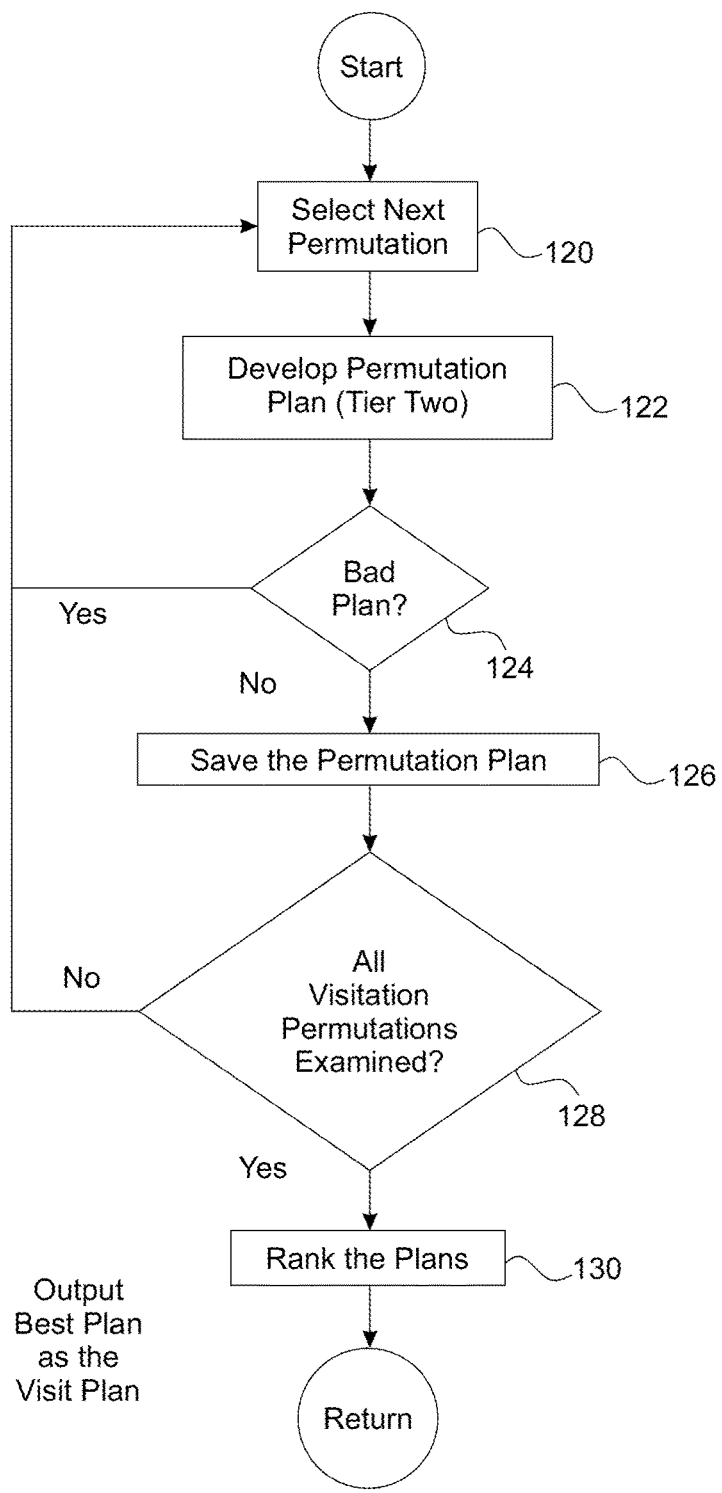
FIG. 4 is a flowchart illustrating example functions for determining a visitation sequence plan, according to an example implementation.

FIG. 4 is a flowchart illustrating example functions for determining a visitation sequence plan, according to an example implementation. Initially, at block 120, a next permutation is selected from the list of all possible permutations. At block 122, a permutation plan is developed, for example as described in FIG. 3. The permutation plan is evaluated at block 124, and if the plan fails, the algorithm moves to evaluate a next permutation back at block 120. If the plan is successful, at block 126 the permutation plan is saved. At block 128, it is determined whether all permutations have been examined. If not, a next permutation is selected again at block 120. If so, at block 130, the plans are ranked, and a best plan is out.

Functions in FIG. 4 guide development and construction of the visit permutation plans, which are ranked and down selected to form a visit sequence plan output for execution.

A visit permutation plan score is generated for each permutation plan to rank and down select to the final visit sequence plan. Collection success for targets, their priority, remaining fuel, and inspection performance quality (within inspection tolerance) are combined into the score in a weighted manner. With this type of scoring, the visit permutation plan with the highest score is selected to be the visit sequence plan output for execution.

Within plan generation, search branch pruning and backtracking occurs. Typically, there are enough inspection options to provide at least one viable option for a first target in a permutation. However, fuel and time limitations along with other orbital complexities may result in no satisfactory options, thereby causing a failed permutation plan right from the start. If the first target is not viable, then all permutations starting with that target are removed from further consideration. This is part of the backtracking feature to continue exploring the solution space.

If after a successful inspection plan for the first target, the resultant plan is not successful for a later target in the permutation, then the algorithm directs a new starting point for the plan using the next best permutation. This is also part of the first tier backtracking feature. In this situation, only a partial permutation plan from this starting target would be generated. All subsequent permutations containing the failed target in that sequenced location are removed from further consideration.

If a complete visitation plan for all targets in the permutation was generated and additional computational resources are available, then the next viable permutation is selected and a plan developed, as shown in FIG. 4. An example of a visit permutation set for three targets before and after pruning for failed target visit plans is shown in Table 3 below.

TABLE 3

| Visit Permutations and Failed Visits | Pruned Permutations for three Targets to Visit |
|---|---|
| 1, 2, 3 | |
| 1, 3, [2] | |
| [2, 1, 3] | 1, 2, 3 |
| [2, 3, 1] | 1, 3 |
| 3, 1, 2 | 3, 1, 2 |
| 3, [2, 1] | 3 |

In the example shown in Table 3, the entire visit permutation set is shown in the left column with good target visit plans shown in unmodified text and failed target visit plans shown in brackets. After search branch pruning, the remaining permutation plans are shown in the right column. Note that two permutations have full plans, i.e., (1,2,3) and (3,1,2). The rest have partial plans. The permutations starting with target 2 have been pruned out and thus have no plans.

If all visit permutation plans are constructed, or if there are no additional computational resources available and mission directives have been met, then the developed visit permutation plans are saved for comparison and down selection.

If a visit permutation plan has all targets in a permutation visited and the plan meets mission constraints, then the visit permutation plan score for that plan will naturally be higher than any partial visitation plan. The down selection picks the visit permutation plan with the highest score as the visit sequence plan output for execution.

A visitation sequence plan summary status board is generated to delineate the selected target visitation sequence, inspection options, scores, any failures, collision events, and resources used if the plan is to be executed. The status board, along with depictions of the expected trajectories, serves to provide justification for the planner selection, along with plan execution expectations, and visitation success results. Repeated updates of this summary status board at each iteration entry serves to build confidence in the planner's ability to adapt to spacecraft, target, and environmental changes.

Figure 5:
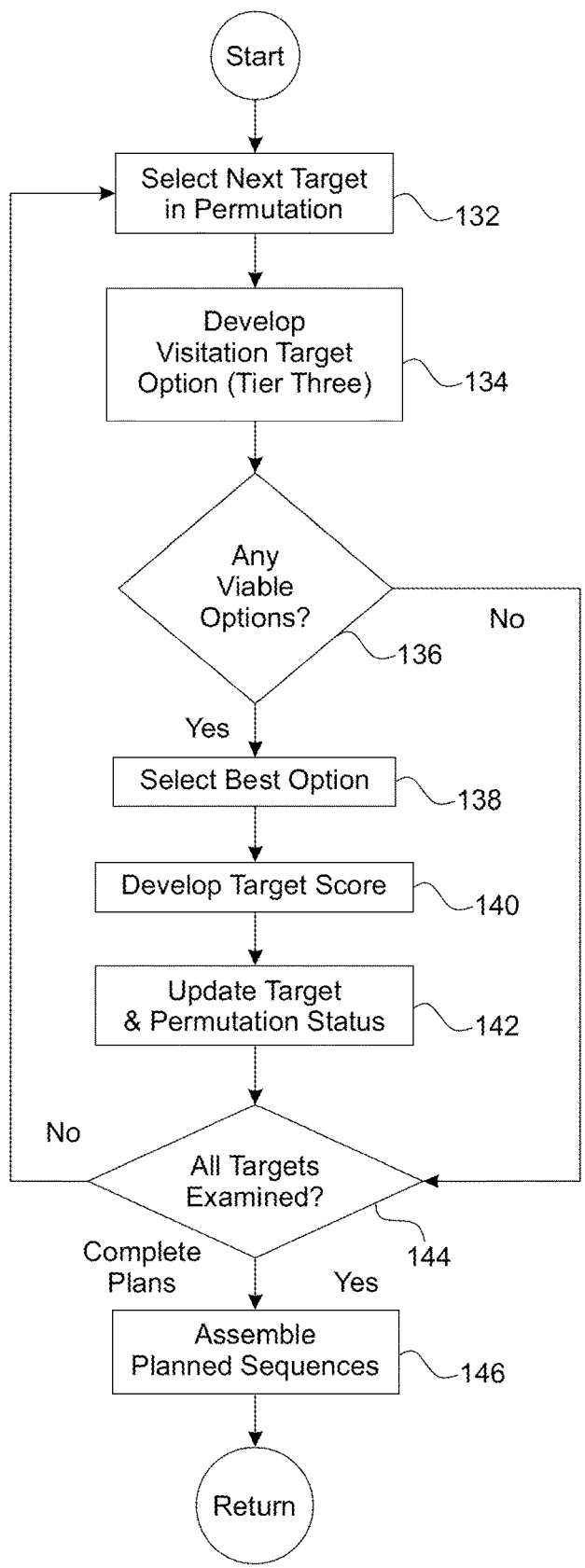
FIG. 5 is a flowchart illustrating example functions for determining a visitation permutation plan, as shown at block of FIG. 4, according to an example implementation.

FIG. 5 is a flowchart illustrating example functions for determining a visitation permutation plan, as shown at block 122 of FIG. 4, according to an example implementation. Initially, at block 132, a next target in a permutation is selected and at block 134, a visitation target option is developed. At block 136, if there are no viable options, the algorithm determines if all targets have been examined in order to return to block 132 to select a next target for evaluation. If there are viable options at block 136, the algorithm selects a best option at block 138, develops a target score at block 140, and updates target and permutation status at block 142. After all targets have been examined at block 144, planned sequences are assembled at block 146.

Thus, following an update of spacecraft, target, and other objects' information, the target visit sequence in the permutation are carried out, with visitation options for each target developed, scored, ranked, and down selected to the best one. The plan of the best option becomes the target unique visitation plan for that target. When all targets in the permutation are evaluated, then the planner assembles the target unique visitation plans into a visit permutation plan.

For the first target in the visit permutation, the initial spacecraft, target, and other object's trajectory parameters are updates received for processing. Incorporation of new inspection directives are used. Spacecraft fuel resources, along with time remaining to complete the inspection updates are also the updates that are received.

For subsequent targets in the permutation, the initial trajectory parameters are taken from the parameter update set for the spacecraft, target, and other objects at the end of visiting the previous target. Spacecraft fuel and time reserves are also taken from the values at the end of visiting the previous target.

There is a variety of options to visit a target. Two option components are used to create visitation options including (i) transfer orbit location and (ii) inspection orbit starting location. These orbit related points are key to establishing the spacecraft orbit trajectories from its initial location, through the many interdependent trajectory sequence and constraints, and ending with an inspection orbit at the target that meets the inspection tolerances and constraints.

A transfer orbit location is required because the spacecraft is usually in a different orbit than the target, due to orbit shape, inclination, or parameter differences. Except for co-planar orbits, there will be two points of intercept between the spacecraft orbit and the target orbital plane. One point is closer to the current spacecraft location, and the other point will be an extra half orbit further. The algorithm determines a location of these points, and uses the locations as an option parameter. For concentric orbits, the algorithm uses the current spacecraft location and its location half an orbit away as the two points.

Figure 6:
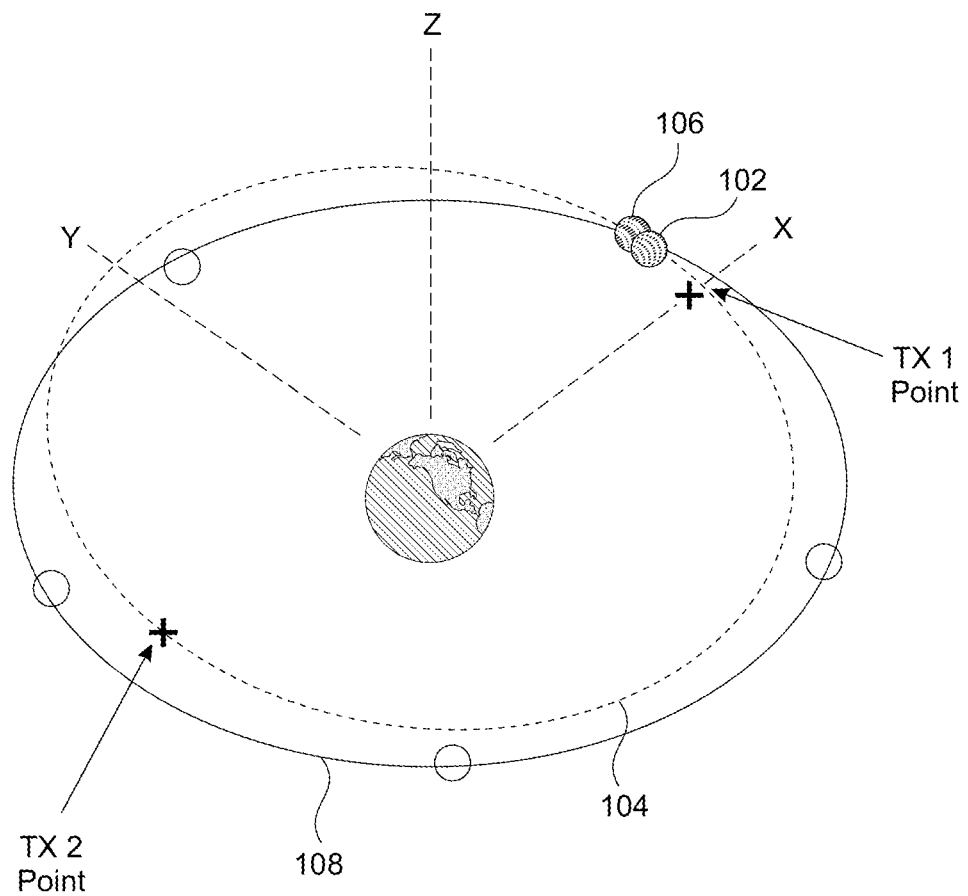
FIG. 6 illustrates an example of multiple orbits and orbiting objects around earth with transfer point locations, according to an example implementation.

FIG. 6 illustrates an example of multiple orbits and orbiting objects around earth with transfer point locations, according to an example implementation. The orbiting target object 102 (e.g., a satellite) is shown in the first orbit 104, and the spacecraft 106 (e.g., chaser vehicle) is shown in the second orbit 108. Transfer point locations $TX_1$ and $TX_2$ for the spacecraft 106 are depicted where the spacecraft 106 can use propulsion or other means of movement to transfer from the second orbit 108 to the first orbit 104 in order to intercept the orbiting target object 102.

An inspection orbit starting location controls an inspection type based on how many inspection orbit starting locations are possible. The inspection orbit starting location is the location following any orbital hopping maneuver to get the spacecraft in position for an inspection. The algorithm accommodates many inspection types, such as for example, a "football" and a "perch" type inspection. A football type inspection is when a relative orbit of the spacecraft about the target is shaped like a football. A perch type inspection is when a relative orbit of the spacecraft about the target is stationary. A Home-on-Target (HOT) perch is possible by time controlled varying of the stationary point.

Figure 7:
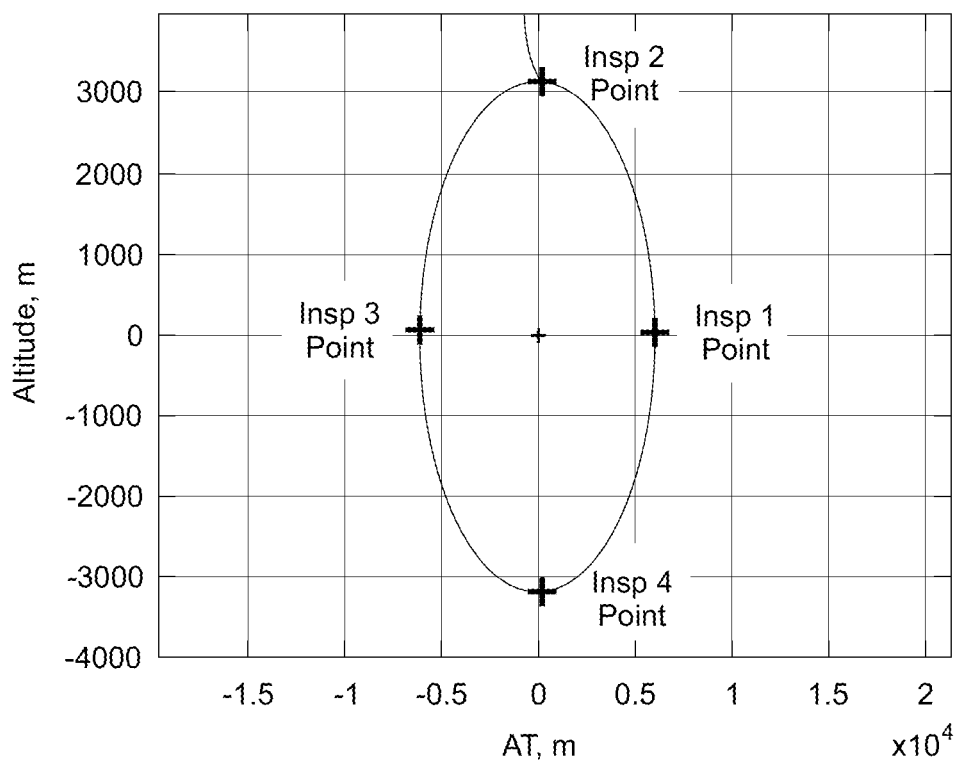
FIG. 7 illustrates a graph showing example inspection orbit starting locations for a football inspection type, according to an example implementation.

FIG. 7 illustrates a graph showing example inspection orbit starting locations for a football inspection type, according to an example implementation. The y-axis represents altitude and the x-axis represents along-track (AT). For a football type inspection, out of the full inspection orbit locations possible, the algorithm uses four key orbit locations as starting location options: same altitude but either leading the target in along track or trailing the target in along-track (AT); and same along-track position as the target but either above the target in altitude, or below the target in altitude. In FIG. 7, the target is represented by the plus-sign (+) in the center at position (0,0) and the four orbit locations are represented as insp 1 point, insp 2 point, insp 3 point, and insp 4 point. These locations govern the line of sight direction of the spacecraft to the target. Some locations may view the sun more than other locations, which may cause a sun failure condition.

For Perch type inspections, no inspection options are possible since the perch inspection directive would dictate the inspection starting location.

Referring back to FIG. 5, a visitation option at block 136 is hence a combination of the options created from the transfer orbit starting location and the inspection orbit starting location. All visitation options are evaluated for fuel remaining, occurrence of any collision event, and any failures due to lack of fuel, time, sun avoidance, and inspection quality. The option with no failures and has the highest fuel remaining is selected as the best option for the target at block 138.

For each target, a target unique visitation status board is constructed. The status board displays the target under consideration in the permutation along with the status of each option being constructed. The status board is updated when each option has been developed and shows fuel and time remaining, occurrence of any collision event, and any failures due to lack of fuel, time, sun avoidance, and inspection quality.

If there are no viable visitation options for a target, then a bad permutation plan indication is returned to tier 1. The remaining targets in the permutation are removed from further consideration. The target unique visitation plan for targets already evaluated are collected to make up the partial visit plan are also provided to tier 1.

For each target, at the completion of all the options for a target, a target unique score is determined, at block 140. The score uses the same scoring method as was described earlier. The only difference here is that the score is for a single target visit, not a cumulative score for an entire visit sequence. Metrics are saved to support updating the permutation score and summary status board. The algorithm continues until all targets in the permutation are examined. All plans, complete, or partial are returned to tier 1 for sorting and selection.

Figure 8:
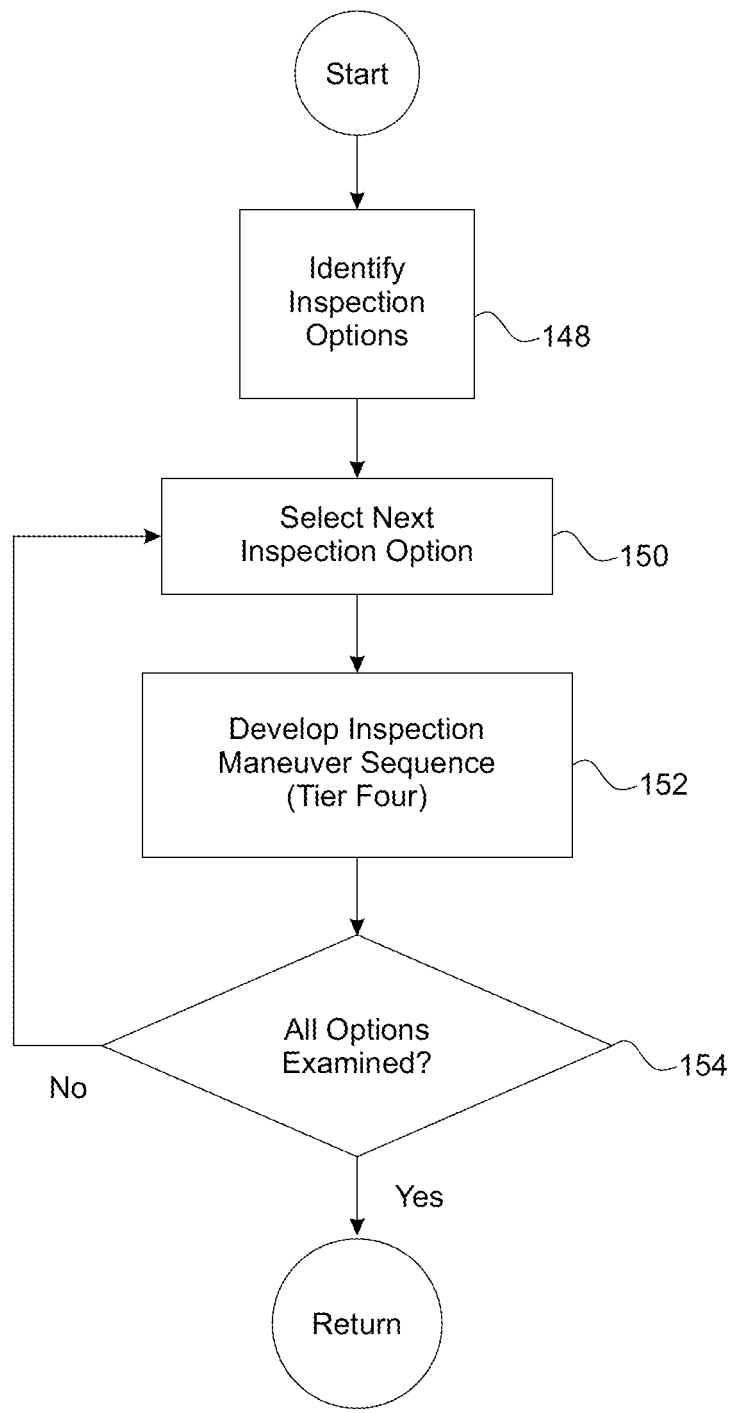
FIG. 8 is a flowchart illustrating example functions for determining a visitation target option, as shown at block of FIG. 5, according to an example implementation.

FIG. 8 is a flowchart illustrating example functions for determining a visitation target option, as shown at block 134 of FIG. 5, according to an example implementation. Initially, at block 148, inspection options are identified. A next inspection option is selected at block 150, and an inspection maneuver sequence is developed at block 152. Once all options are examined, at block 154, the options are output.

Thus, functions in FIG. 8 direct construction of the visitation options starting with a target selected in a previous tier. A lower tier develops the plan for a visitation option that consists of maneuver sequences needed to perform desired inspection option. Table 4 below shows visitation option constraint parameters for the inspection types considered.

TABLE 4

| General Constraints per Target |
| --- |
| :Number of visits |
| :Absolute time to complete |
| :Time interval constraints |
| :Orbit Inspection Tolerances |
| :Minimum Sun exposure angle |
| :Maximum Sun exposure angle |
| :Maximum Sun exposure angle |
| :Mission Priority |
| Football Constraints |
| :semi major axis, along the Z-Bar |
| :semi minor axis, along the V-Bar |
| :time to visit by |
| Perch Constraints |
| :perch angle off V-Bar in altitude direction |
| :perch angle off V-Bar in cross-track direction |
| :length of perch in days |
| :length of perch in seconds |
| :time to visit by |
| Collision Avoidance |

Different visitation trajectory approaches are possible, and for minimum fuel use, the algorithm uses an orbit matching approach to determine the spacecraft orbital trajectory. This method requires more time to allow the spacecraft to naturally orbit into position. The algorithm also evaluates visitation trajectories using a direct pursuit approach, which may use more fuel but saves time to reach the desire position.

The orbit matching approach takes advantage of the natural astrodynamics properties to build each leg of the orbit trajectory. Earth gravitational properties that govern orbital positioning and velocities are used to determine proper wait times, burn times, and burn locations to get the spacecraft to orbit match and rendezvous with the target, and to do the final inspection.

The direct pursuit approach takes advantage of chaser maneuvers that can more quickly approach the proper inspection point and orbit to a target. This approach is more suited for short distances between chaser and target, with a need for starting inspection in a relatively short time. Typically, more fuel is expended as a result.

For visitation options using an orbit matching approach, there is a variety of options to consider to visit a target. The algorithm uses two parameter option components to create our visitation options: transfer orbit location and inspection orbit starting location. These orbit related points are key to establishing the chaser orbit trajectories from its initial location, through the many interdependent trajectory sequence and constraints, and ending with an inspection orbit at the target that meets the inspection tolerances and constraints. The option components are described above. For a direct pursuit approach, the current expected spacecraft location is the transfer orbit starting location. The inspection orbit starting location is the desired direct pursuit point.

Figure 9A:
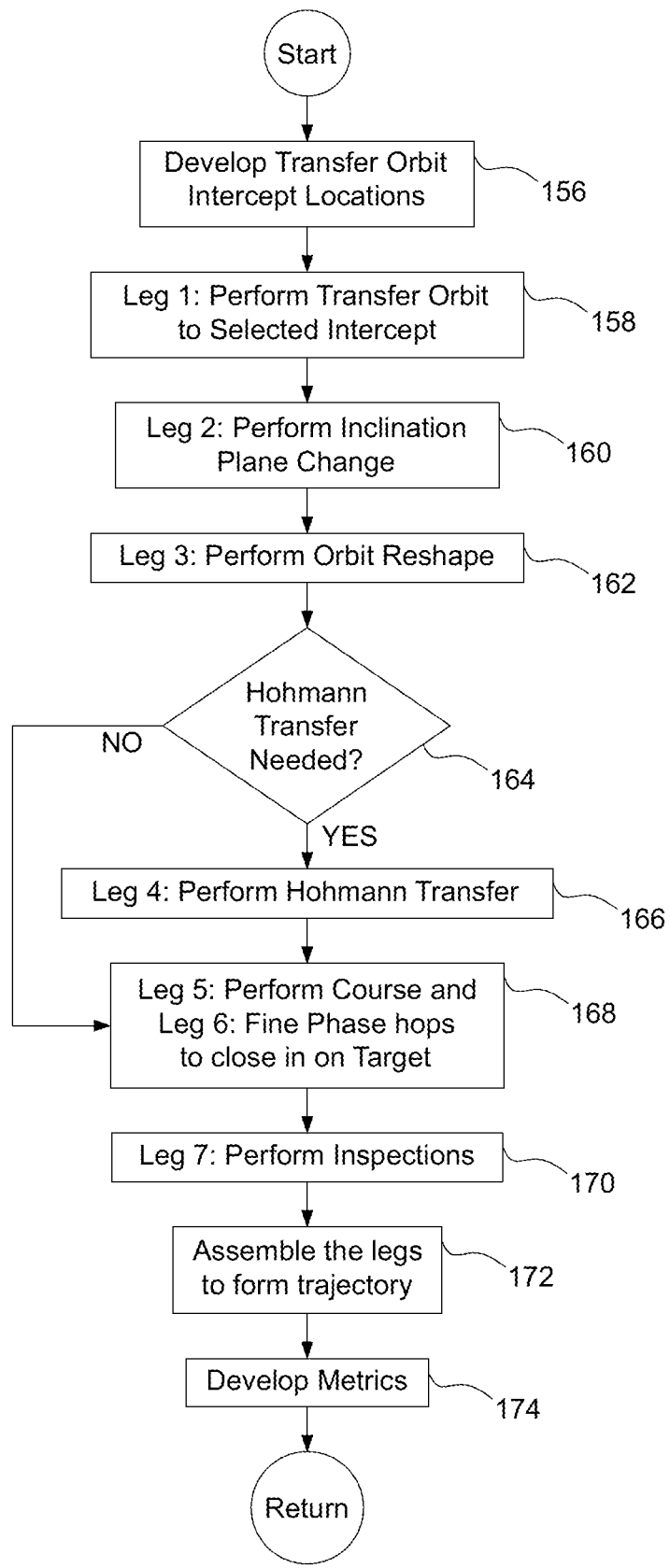
FIG. 9A is a flowchart illustrating example functions for determining an inspection maneuver sequence, as shown at block of FIG. 8, according to an example implementation.

FIG. 9A is a flowchart illustrating example functions for determining an inspection maneuver sequence, as shown at block 152 of FIG. 8, according to an example implementation. Initially, at block 148, inspection options are identified. The spacecraft trajectory plan for a visitation option is an assembly of various "legs" consisting of wait times and maneuvers to support the rendezvous and inspection of a target. The algorithm assumes that spacecraft attitude determination for the rendezvous legs are handled by the onboard GN&C to position the spacecraft attitude for protecting the spacecraft components or increasing the vehicle's resources. For the inspection legs, the algorithm provides attitudes for proper inspection of the targets during the inspection orbits.

In an ever changing spacecraft, target, and orbital object environment, the algorithm routinely performs the updates for each leg of the plan. A first update includes detection and avoidance of possible collision events. In an autonomous mission, there is no time instance when the spacecraft is free from updating position and velocity status on each object and checking for a possible collision event somewhere along the leg. Even when the spacecraft is just staying in its current orbit, a collision event can appear due to other objects entering the path of the spacecraft. Since these are predictable events, and the events will affect follow-on planning, the algorithm detects the events and determines a way to avoid the event if it appears, either by an extra avoidance burn, or if possible, extending or shortening some earlier wait times, thereby allowing the object to pass outside of the collision event occurrence zone.

A second update includes time usage and time remaining constraint violations. The algorithm determines time lapse in the leg and updates cumulative time lapse since start of the visitation option, and start of a visit permutation. The algorithm also checks for exceedance of any mission time constraints.

A third updates includes fuel usage and fuel remaining constraint violations. The algorithm determines fuel use in the leg and updates cumulative fuel usage since start of the visitation option, and start of a visit permutation. The algorithm also checks for exceedance of any mission fuel use constraints. Any fuel use due to collision avoidance is also included.

A fourth updates include orbital trajectory advancement. In preparation for the next leg, the algorithm calculates the orbital trajectory parameters for the leg, computes the expected orbital values (i.e. position, velocity, and range, angle and time lapse from perigee) for the end of the leg, and updates the spacecraft visitation plan to include the orbital trajectory of the leg. The algorithm also advances the target and other orbital objects to the end of the leg.

A fifth update includes relative spacecraft to target computations. The algorithm determines relative spacecraft to target location relationships for easier assessment and evaluation of trajectory and later inspection performance. For the orbit matching approach, the legs described below within FIG. 9A are considered. For the direct pursuit approach, an incremental encroachment approach akin to the description of the HOT Perch inspection leg below (leg 7) is used.

In FIG. 9A, initially at block 156, transfer orbit relative intercept locations are developed. In starting a new visitation, the algorithm uses the current expected spacecraft and target positions and velocities, along with their orbital parameters, to determine whether a transfer orbit needs to take place, and if so, where to start the orbit, and where to end it. As discussed above, generally, the spacecraft is in a different orbit than the target, due to either orbit shape, inclination, or parameter differences. Except for co-planar orbits, there will be two points of intercept between the spacecraft orbit and the target orbital plane. One point is closer to the current spacecraft location, and the other point will be an extra half an orbit farther away. The algorithm determines the location of these points and uses them as the possible transfer orbit points, each being an option component. For concentric orbits, the algorithm uses the current spacecraft location and its location half an orbit away as the two points.

The transfer point location is adjusted to include any inspection altitude starting point offset from the target's orbit in order to minimize any later spacecraft orbit altitude adjustments for inspection. Classical astrodynamics orbital computations are done to determine the transfer orbit parameters and transfer orbit locations.

A transfer orbit starting point varies based on a shape of the orbit. For an elliptical chaser orbit, the transfer orbit starting point is chosen to be either the perigee or the apogee, whichever one is farthest in orbit along the spacecraft direction opposing the location of the transfer orbit point. For a circular chaser orbit, instead of using the perigee and the apogee, one of the expected current position and its position half an orbit away is chosen, whichever one is farthest in orbit along the spacecraft direction opposing the location of the transfer orbit point. If the spacecraft and target have the same orbits, a transfer orbit is not necessary. Also, if the spacecraft and target have co-planar concentric circular orbits, a transfer orbit is not necessary. If the expected current position of the spacecraft is different from the transfer orbit starting point, then a wait time leg is inserted into the visitation option plan, prior to performing the transfer orbit. If any additional wait times are needed for collision event mitigation, this is also incorporated into the leg.

Figure 10:
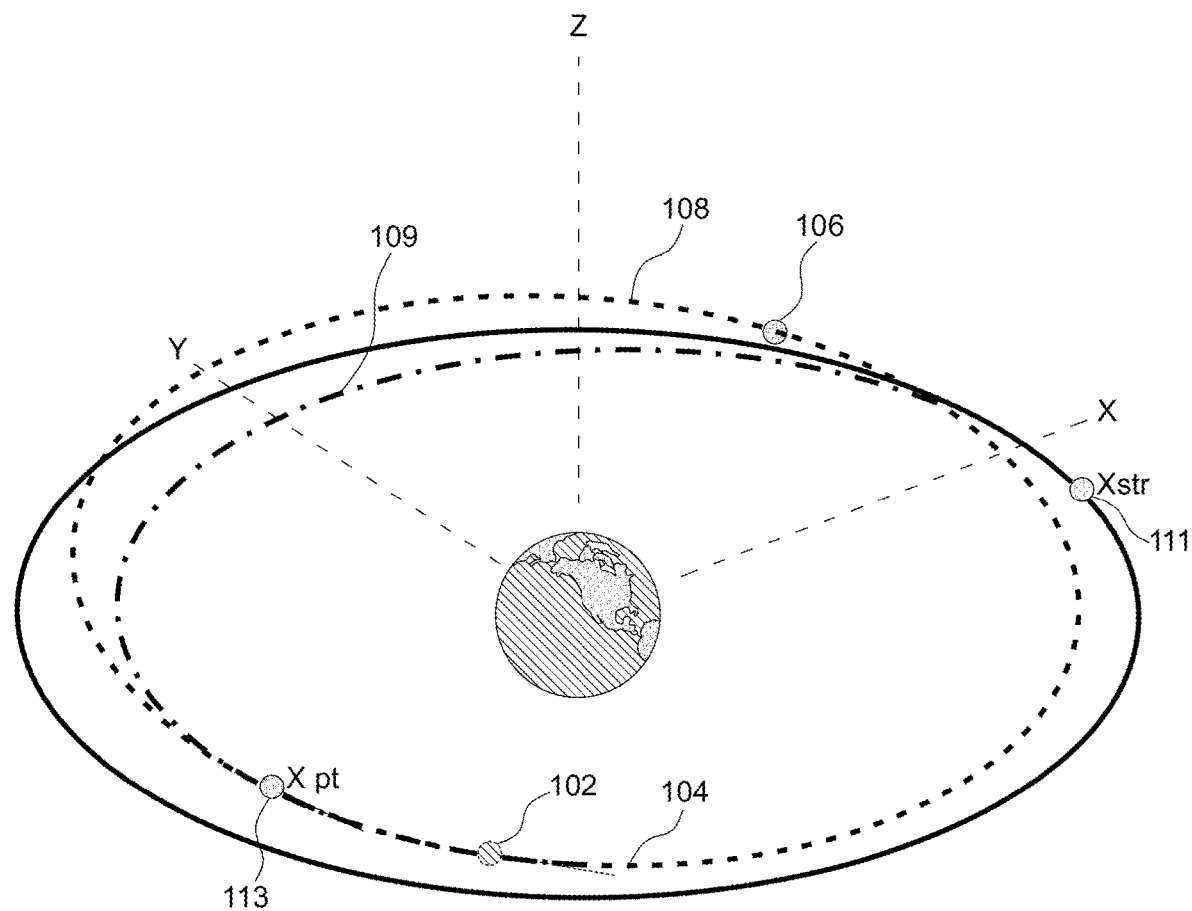
FIG. 10 illustrates an example of multiple orbits and orbiting objects around earth with selected transfer orbit intercept points, according to an example implementation.

Next, at block 158, a transfer orbit to selected intercept is performed. FIG. 10 illustrates an example of multiple orbits and orbiting objects around earth with selected transfer orbit intercept points, according to an example implementation. The orbiting target object 102 (e.g., a satellite) is shown in the first orbit 104, and the spacecraft 106 (e.g., chaser vehicle) is shown in the second orbit 108. Transition of the spacecraft 106 from the second orbit 108 to a transfer orbit 109 in order to get to a selected transfer orbit intercept point and transition to the first orbit 104 of the orbiting target object 102 requires consideration of a transfer orbit starting point 111. Following, a transfer orbit location 113 is a point where the spacecraft 106 enters the first orbit 104.

Referring back to FIG. 9A, at blocks 160 and 162, inclination plane and orbit reshape change is performed. At the transfer orbit intercept location, the algorithm determines if the spacecraft has to do an inclination plane change and/or an orbital reshape change. When the spacecraft and the target orbits are not co-planar, an inclination plane change from the spacecraft orbital plane into the target orbital plane is required. An inclination plane change redirects a velocity direction of the spacecraft to align with the target orbital plane, thereby maneuvering the spacecraft to a new orbit co-planar with the target's orbit.

An orbital reshape change adjusts the post inclination plane velocity magnitude to match that of the target's velocity at that point in the orbit. In conjunction with the inclination plane change, if an orbital reshape change is required, the spacecraft velocity changes to accomplish both are combined as one maneuver burn to align the spacecraft's new orbit to closely match the target's orbit.

At block 164, a decision is made whether to perform a Hohmann transfer orbit. If needed, at block 166, for circular spacecraft and target orbits with dissimilar altitudes more than a desired value, the algorithm uses a Hohmann transfer orbit to get the spacecraft into the desired altitude. The Hohmann transfer requires an initial burn maneuver to modify the spacecraft's orbit into the transfer orbit, and then a second burn maneuver, typically performed at half a transfer orbit period later and with nearly the same $\delta V$, is used to get the spacecraft from the transfer orbit into the desired orbit. A spacecraft transfer from a smaller orbit to a larger orbit require increased $\delta V$, while a transfer from a larger orbit into a smaller orbit requires a decrease in $\delta V$.

The algorithm computes a required lead angle to time when the burns should occur so as to minimize for further hopping maneuvers to get the chaser to the selected inspection starting point. This wait time is considered a "pre-Hohmann transfer" wait time leg in the visitation plan.

At block 168, large coarse and refined hops to close in on target are performed. At this point of the visitation trajectory, the spacecraft and target orbits are co-planar and nearly the same shape. The spacecraft may also be at nearly the right inspection altitude. However, the spacecraft and target may be at different parts of the orbit, thereby making them possibly millions of meters separated from one another, in the along-track sense. For spacecraft and target being circular orbits, a Hohmann transfer orbit with the right lead time may bring the chaser to nearly the desired inspection location, but some along track adjustments may need to take place. It is for these situations that orbital phase hops are needed.

For short distances (<200,000 m) and nearly circular spacecraft and target orbits, the C-W equation is frequently used to determine phase hop maneuver burns to get the spacecraft to close in on the target, either by catching up to it or letting it catch up to the spacecraft, depending on the situation. For longer distances or elliptical orbits, the algorithm uses the classical definition of orbital phase hop to derive the proper $\delta V$ to maneuver the chaser into the phase hop transfer orbits.

The algorithm keeps to integer transfer orbital periods to simplify the maneuver determination, and to allow hopping to start at any part of the orbit. The algorithm reviews the visitation option and incorporates any desired along track inspection offset needed by the visitation option. The algorithm reviews the time remaining constraints to determine the number of hopping periods to perform the hops, preferring to use as many periods as possible less than an absolute maximum in order to minimize $\delta V$ usage. If the algorithm determines that the coarse phase hops will not get the spacecraft to the inspection starting location within the inspection tolerance distance, a second fine phase hop is added that lasts one hop transfer period in order to achieve the required distance.

At block 170, inspection orbits are performed. The inspection orbits are performed after the encroaching phase hopping orbits are completed. Table 4 above depicts the inspection constraint parameters. The algorithm is set up for performing football or perch type orbits. Both use the C-W equations for generating the inspection burn maneuvers.

For football orbits, multiple inspection visit orbits can be set up. A burn maneuver to make that happen is not needed. For Perch orbits, the algorithm allows selection of station keeping or Home-On-Target (HOT) Perch orbits. The algorithm uses the inspection constraint parameters to perform the station keeping perch. For HOT Perch, the algorithm starts with the inspection constraint parameters, but incorporates an encroachment or departure burn maneuver at repeated intervals to perform incremental HOT inspections at a closing or opening range rate. In one example, the algorithm only allows Perch type inspections for elliptical inspection orbits. In other examples, the algorithm allows football type inspections for elliptical inspection orbits. The algorithm treats each burn maneuver in the inspection as a leg, and determines the attitude plan to direct any on-board sensor line of sight (LOS) to view the target during the inspection. The LOS is checked to determine if inspection is also exposed to viewing the sun or any other source that is to be avoided.

At block 172, the legs are assembled to form the visitation option trajectory plan. The complete visitation option trajectory plan is made up of assembled legs of the spacecraft wait times and burn maneuvers At block 174, metrics are developed, such as status metrics, for the given visitation option inspection plan for score creation. These metrics include any failures due to lack of fuel, time, sun avoidance, and inspection tolerance, along with remaining fuel use and time. Such metrics for each visitation options are established and saved.

As a result, outputs of the planner consist of the combined visit permutation plans for the targets, along with the plan metrics. Each permutation plan contains the timed wait and maneuver instructions. Timed attitude guidance instructions for inspection are also provided.

Figure 9B:
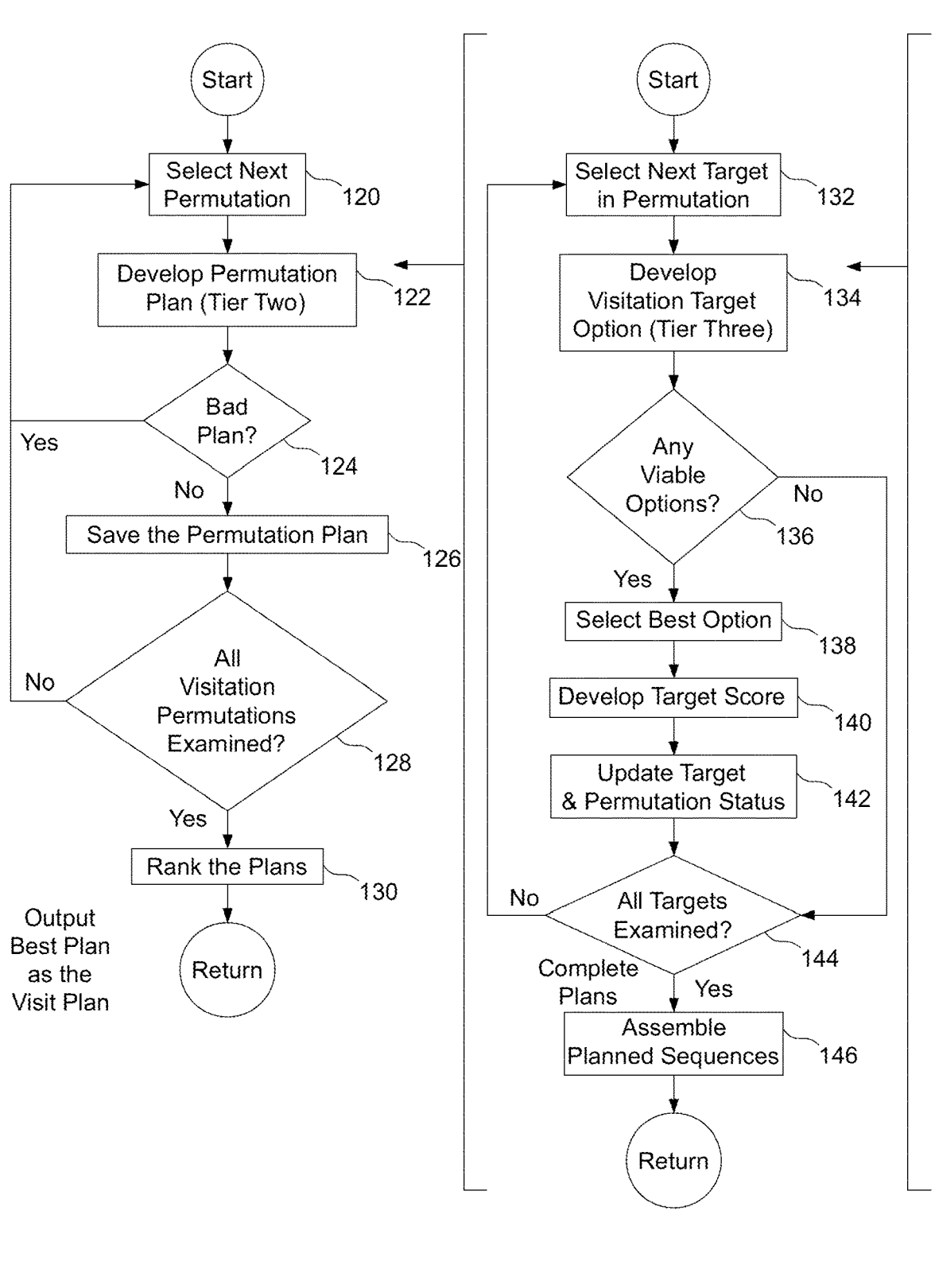
FIGS. 9B-9C are an illustration of an embodiment including the various flowcharts of FIG. 4, FIG. 5, FIG. 8, and FIG. 9A in a cooperative arrangement.
Figure 9C:
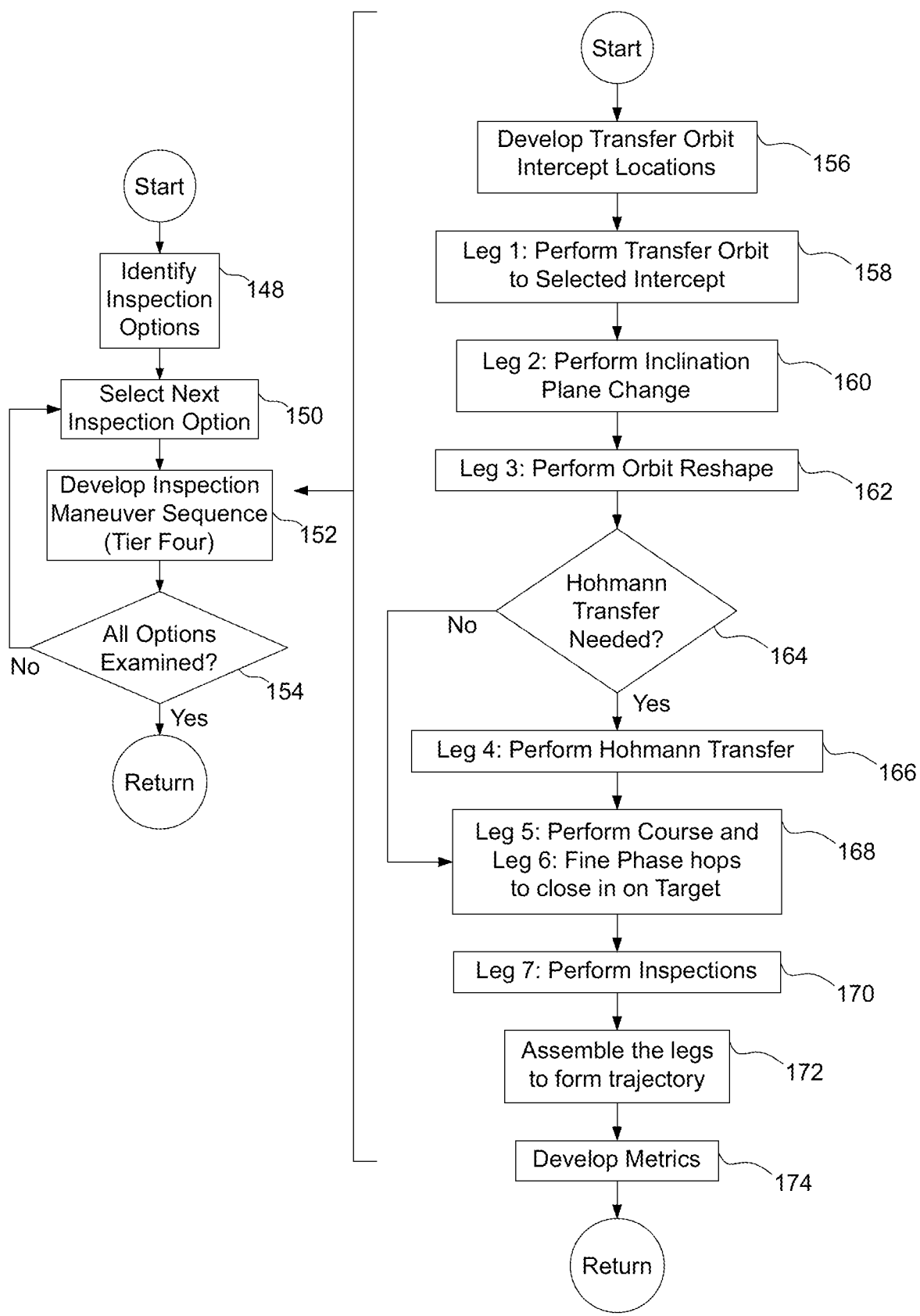

FIGS. 9B-9C are an illustration of an embodiment including the various flowcharts of FIG. 4, FIG. 5, FIG. 8, and FIG. 9A in a cooperative arrangement. Referring to FIGS. 9B-9C, the various flowcharts are shown in a tiered arrangement, and collectively may be utilized in an iterative process for determination of all permutations for possible rendezvous visits with target orbiting objects.

Figure 11:
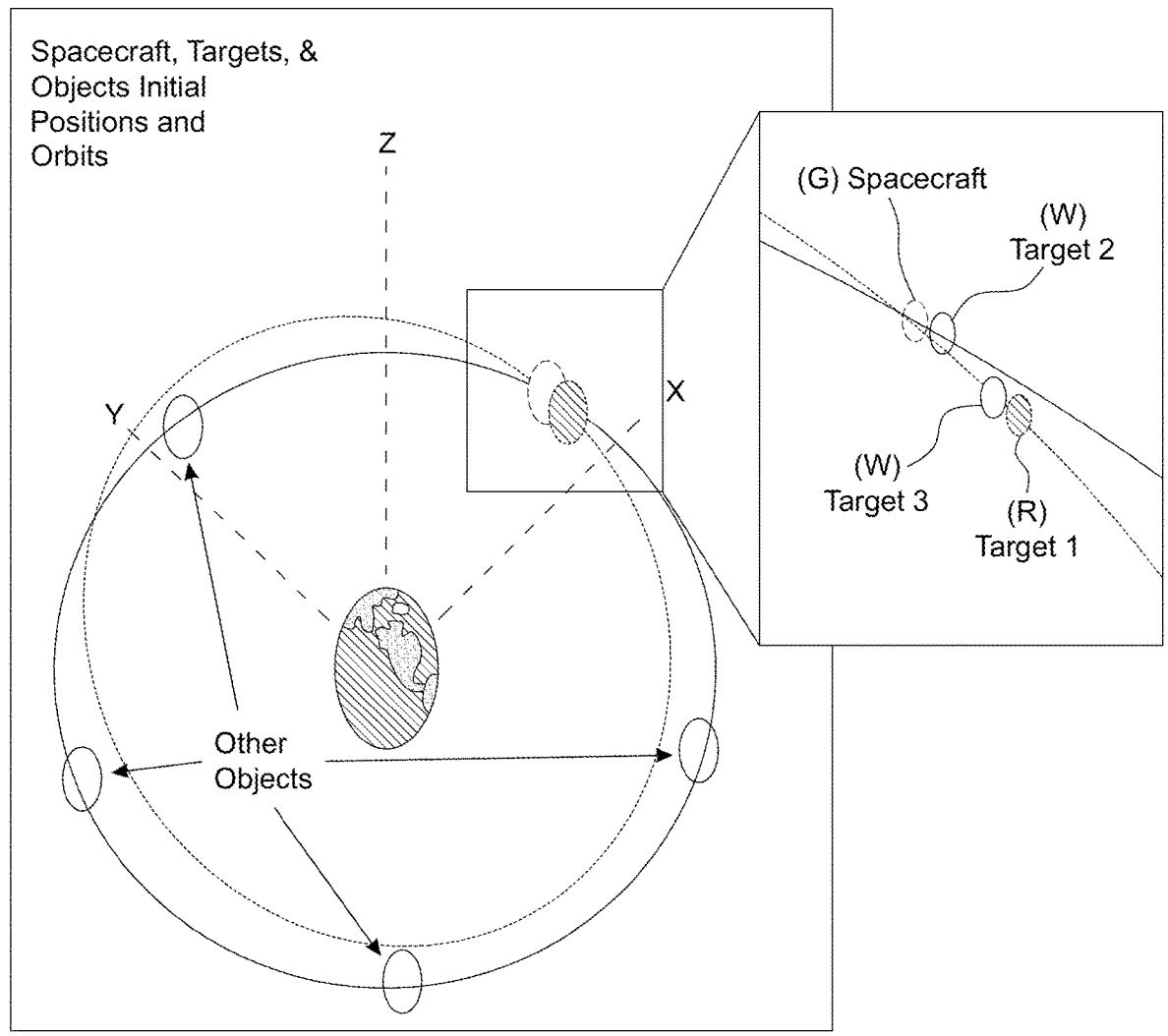
FIG. 11 illustrates an example of multiple orbits and the three orbiting targets to visit, according to an example implementation.

An example mission scenario is now described, in which the mission includes three targets to visit. FIG. 11 illustrates an example of multiple orbits and the three orbiting targets to visit, according to an example implementation. FIG. 11 also illustrates a table that shows the ID number, priority, orbit type, and desired inspection type for each target. The target ID, priority, and inspection type are user directives to the spacecraft. User or on-board data on target position and velocity helps the spacecraft to derive the target orbit type. Four other objects in geosynchronous orbits are also present in this example. The spacecraft is currently in a geosynchronous orbit around the earth waiting for a mission directive. The spacecraft currently has 2000 m/s worth of fuel and can allow up to 10 days per target to complete the mission (note that example fuel and time constraint values are included for the purpose of showing algorithm results in generating a full visitation plan; however, realistic values may constrain the planner from satisfying all criteria and work with partial visitation plans). The example mission shown in FIG. 11 is interesting in that for some visitation sequences, it requires the spacecraft to transition from circular to circular orbits, circular to elliptical orbits, and elliptical to circular orbits to visit the three targets. The order of the orbit transitions depend on the visit permutation.

Referring to functions of FIG. 2, initially, pre-planning is performed. Since the spacecraft is not working a mission and is waiting for a new mission directive, in response to this mission directive, the pre-planning unit gathers data on the three targets of interest, along with the latest data on spacecraft, target, and other objects in the environment, all the mission planning constraints, and proceeds to set up a visit permutation set, which is the same set as that shown in the left column of Table 3 above.

In this example, there is no change to the plan monitor as it is always monitoring statuses for the spacecraft, target, and other objects, looking for changes that may affect a replanning if the spacecraft is in the middle of executing a visitation sequence plan. In this scenario, since the spacecraft is not executing a plan, the plan monitor continues as-is.

With the new mission directive, the plan generator begins planning for the mission visitation sequence. Each visit permutation is developed and evaluated to determine the best visit permutation plan to use as the visitation sequence plan output.

As the evaluation proceeds, in this example, a result is the same as the right column of Table 3 above which shows permutations involving target ID 2 as the first target never successfully collected, and only permutations [1,2,3] and [3,1,2] have full target set successful collections. Now suppose ultimately permutation [3,1,2] wins due to its highest score. A result for a [3,1,2] visitation sequence is now analyzed and compared against the other permutations.

The spacecraft's first target to visit is target ID3, which has a circular orbit. Since the spacecraft has an initial circular orbit, this target visit involves a circular to circular orbit planning. Based on their initial position and velocities, the two orbits are fairly co-planar, and the orbital radius are not that different. More than $9 \times 10^5$ m separated the spacecraft from the target. Note that all other targets and objects are grouped as other objects for this visit.

For this first visit, the algorithm evaluated eight orbit match options and two direct pursuit options. The options are labeled from 1 to 10, respectively. Option 2 was selected as the best option, and the maneuvers include: transfer orbit, inclination plan and orbit reshape change, five circular orbital hops, and two football inspection orbits.

In this example, option 2 has the inspection starting point at 3000 m above the target. Target ID3's football inspection was constrained to be 6000 m in the semi-major axis and 3000 m in the semi-minor axis, with a 1000 m inspection tolerance. This was accomplished readily by the algorithm option 2 trajectory. In this example, none of the options had a collision event. Two of the orbit match options fail the sun exposure constraint. The last two direct pursuit options failed due to excessive fuel and time required. Note that only 1.4 mps in $\delta V$ was used in this option and it took 8.3 days to complete. A computed score indicates that Target ID 3 was a High priority target and was collected successfully and with good inspection performance.

The spacecraft's second target to visit is target ID 1, which has an elliptical orbit. Since after the spacecraft has visited the first target, the spacecraft is in a circular orbit, this target visit involves a circular to elliptical orbit planning. Based on their positions and velocities at that point in time, their orbits are not co-planar and their orbits are significantly different in shape and range. More than $6 \times 10^7$ m separates the spacecraft from the target at the start of this visit. Note that all other targets and objects are grouped as other objects for this visit.

For this second visit, the algorithm evaluated two orbit match options and two direct pursuit options. The options are labeled from 1 to 4, respectively. Option 2 was selected as the best option. The maneuvers include: transfer orbit, inclination plan, circular to elliptical orbit match change, seven elliptical orbital hops, and perch inspection starting position with Home-On-Target (HOT) inspection. Option 2 has the inspection starting point at 10000 m from the target. Target ID 1's perch inspection was constrained to be starting at 10000 m from the target, with an along-track offset angle of 70 degrees, and a cross-track offset angle of 20 degrees, with a 5000 m inspection tolerance, in which was accomplished by the algorithm option 2 trajectory. The HOT Perch inspection incrementally takes the spacecraft closer to the target while maintaining the same viewing angle until the chaser is nearly 400 m from the target.

Again, in this example, none of the options had a collision event. One of the orbit match options fail the sun exposure constraint. The last two direct pursuit options failed due to excessive fuel and time required. Note that although this option may have the lowest fuel use, it is still very expensive, requiring 875.9 mps in $\delta V$ and 7.8 days to complete. The majority of the fuel use is expended on inclination plane and orbit reshape change. The score indicates that Target ID 1 was a Medium priority target and was collected successfully and with good inspection performance. A status board shows the cumulative fuel and time usage, along with the cumulative score by the end of the second target visit.

The spacecraft's third target to visit is target ID 2, which has a circular orbit. Since after the spacecraft has visited the second target, the spacecraft is in an elliptical orbit, this target visit involves an elliptical to circular orbit planning. Based on their positions and velocities at that point in time, their orbits are not co-planar and their orbits are significantly different in shape and range. More than $1.5 \times 10^7$ m separates the chaser from the target at the start of this visit. Note that all other targets and objects are grouped as other objects for this visit.

For this third visit, the algorithm evaluated eight orbit match options and two direct pursuit options. The options are labeled from 1 to 10, respectively. Option 6 was selected as the best option. The maneuvers include: transfer orbit, inclination plane change, elliptical to circular orbit match change, three circular orbital hops, and two football inspection orbits. Option 6 has the inspection starting point at 5000 m above the target. Target ID2's football inspection was constrained to be 10000 m in the semi-major axis and 5000 m in the semi-minor axis, with a 1000 m inspection tolerance. This was accomplished by the algorithm option 6 trajectory.

Thus, in this example mission for the [3,1,2] permutation, the individual target unique visit plans are assembled together to form the visit permutation plan. Since [3,1,2] has the highest score of all permutations, its visit permutation plan becomes the visitation sequence plan to output for execution.

FIG. 12 shows an example of a summary status board for the visitation sequence of the example mission, according to an example implementation. A score for the [3,1,2] permutation is "2100648210". This means an expected total δV usage of 1351.7 mps usage. All targets are expected to be successfully collected and within inspection performance. No collision events or other failures are expected when using the visitation sequence plan. The status board indicates a total of 22 days is required to complete the visitation sequence with 8.3 days, 7.8 days, and 5.9 days for each individual target visitation.

Figure 13:
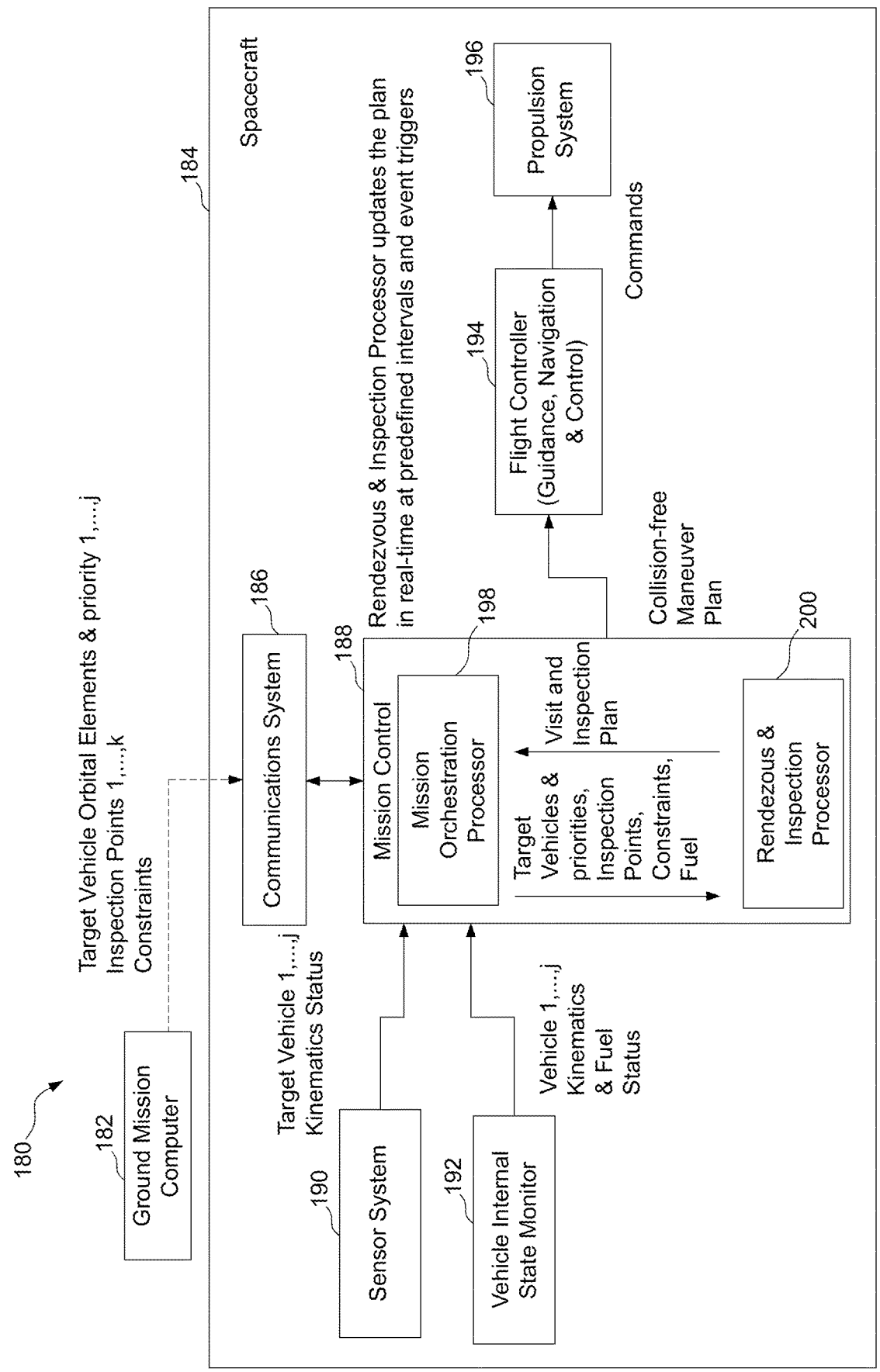
FIG. 13 is a block diagram illustrating an example system for execution of methods described herein, according to an example implementation.

FIG. 13 is a block diagram illustrating an example system 180 for execution of methods described herein, according to an example implementation. The system 180 includes a ground mission computer 182 in communication with a spacecraft 184. Communication between the ground mission computer 182 and the spacecraft 184 can occur using wireless communications directly or over a communication network.

The spacecraft 184 includes a communications system 186 in communication with a mission controller 188. The spacecraft 184 also includes a sensor system 190 and a vehicle internal state monitor 192 in communication with the mission controller 188, which in turn provides outputs to a flight controller 194 (e.g., Guidance, Navigation & Control) that outputs commands to a propulsion system 196.

The sensor system 190 includes a variety of sensors such as 2D/3D tracking and proximity sensors as well as guidance and navigation sensors.

The vehicle internal state monitor 192 determines vehicle kinematics and fuel status, and outputs the information to the mission controller 188.

The mission controller 188 includes a mission orchestration processor 198 and a rendezvous and inspection processor 200. The mission orchestration processor 198 processes target vehicle priorities, inspection points, constraints, and fuel. The rendezvous and inspection processor 200 determines the visit and inspection plan. The mission controller 188 is considered an onboard mission controller for the spacecraft 184, for example.

The flight controller 194 (e.g., Guidance, Navigation & Control) determines specific commands to control the propulsion system 196. The propulsion system 196 can include any type of system, such as an engine or an electric propulsion system that uses any number of fuel types, such as fuel cell, solar, electrostatic, electromagnetic, etc.

Figure 14:
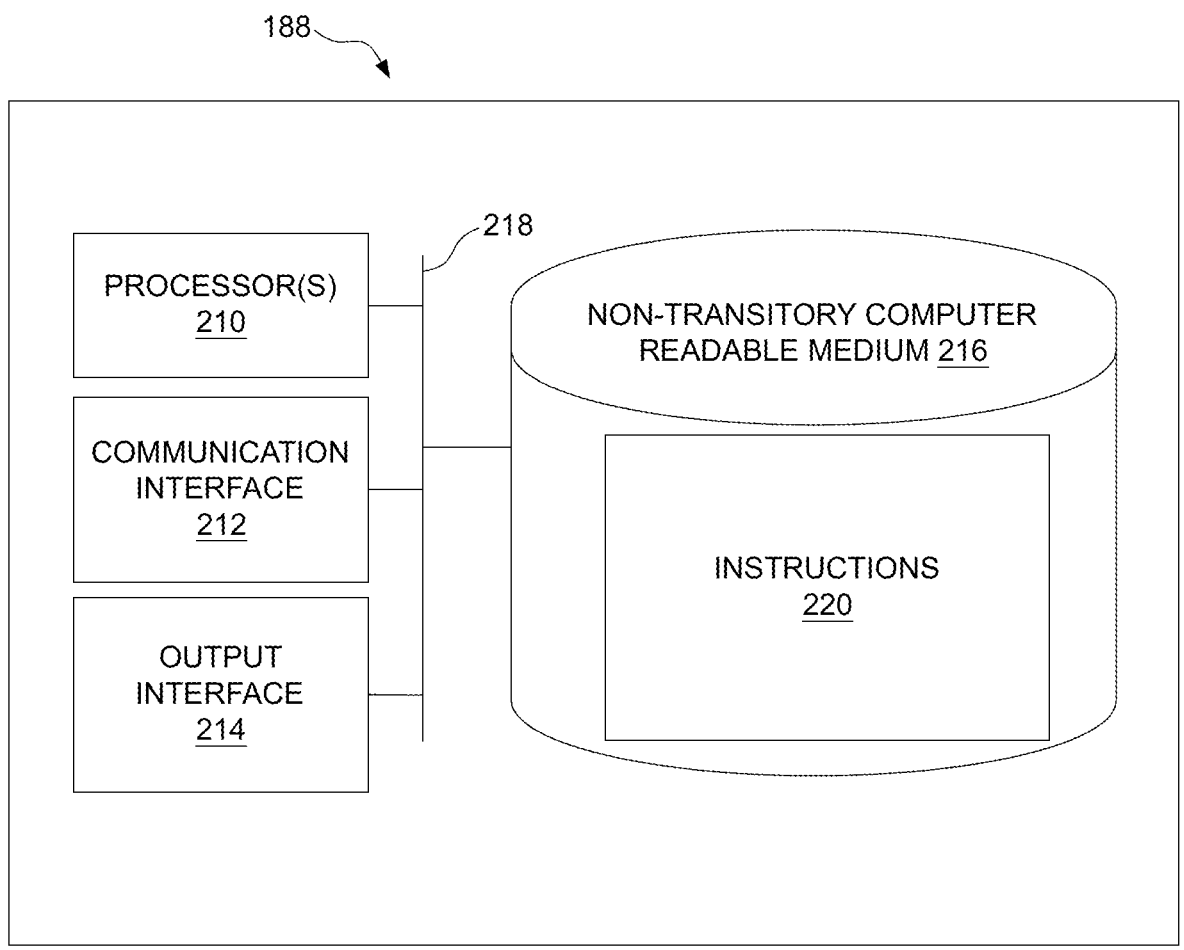
FIG. 14 illustrates an example of the mission controller of the spacecraft in FIG. 13, according to an example implementation.

FIG. 14 illustrates an example of the mission controller 188 of the spacecraft in FIG. 13, according to an example implementation. The mission controller 188 may be considered a computing device that includes one or more processors 210, a communication interface 212, an output interface 214, and non-transitory computer readable medium 216 (e.g., memory), and each component of the computing device is connected to a communication bus 218.

The one or more processors 210 may be general-purpose processors or special purpose processors (e.g., digital signal processors, application specific integrated circuits, etc.). The one or more processors 210 (e.g., shown as the mission orchestration processor 198 and the rendezvous and inspection processor 200 in FIG. 13) may receive inputs from the communication interface 212 (e.g., from the sensor system 190), and process them to generate outputs that are stored in the non-transitory computer readable medium 216. The one or more processors 210 can be configured to execute instructions 220 (e.g., computer-readable program instructions) that are stored in the non-transitory computer readable medium 216 and are executable to provide the functionality of the spacecraft described herein.

The communication interface 212 may be a wireless interface that allow for both short-range communication and long-range communication to one or more networks or to one or more remote devices. The communication interface 212 may include hardware to enable communication, such as transmitters, receivers, and antennas, for example. Thus, the communication interface 212 may be configured to receive input data from one or more devices, and may also be configured to send output data to other devices.

The output interface 214 outputs information for reporting or storage, and thus, the output interface 214 may be similar to the communication interface 212 and can be a wireless interface (e.g., transmitter) as well.

The non-transitory computer readable medium 216 may take the form of computer memory, such as one or more computer-readable storage media that can be read or accessed by the one or more processors 210. The computer-readable storage media can include volatile and/or non-volatile storage components, such as optical, magnetic, organic or other memory or disc storage, which can be integrated in whole or in part with the one or more processors 210. In some examples, the non-transitory computer readable medium 216 is implemented using a single physical device (e.g., one optical, magnetic, organic or other memory or disc storage unit), while in other examples, the non-transitory computer readable medium 216 is implemented using two or more physical devices.

The non-transitory computer readable medium 216 is thus a computer readable medium, and the instructions 220 are stored thereon. The instructions 220 include computer executable code.

In one example, when the instructions 220 are executed by the processor 210, the spacecraft 184 is caused to perform functions shown as described above with respect to FIGS. 4-5 and FIGS. 8-9. In a specific example, when the instructions 220 are executed by the processor 210, the spacecraft 184 is caused to perform functions of establishing, for two or more orbiting target objects to visit, potential permutations for all possible unique maneuver sequences in which to visit the two or more orbiting target objects, and then for each potential permutation, determining a collision-free maneuver plan for defining orbit trajectories to intercept each of the two or more orbiting target objects for each of the possible unique maneuver sequences. Additional functions includes based on the collision-free maneuver plan for each potential permutation, determining an optimal permutation from the potential permutations that meets viewing constraints of the two or more orbiting target objects, a viewing priority, and fuel constraints of the spacecraft, generating a mission visit plan, using the optimal permutation, for the spacecraft to rendezvous with and inspect the two or more orbiting target objects, and causing the spacecraft to rendezvous with and inspect the two or more orbiting target objects according to the mission visit plan.

Figure 15:
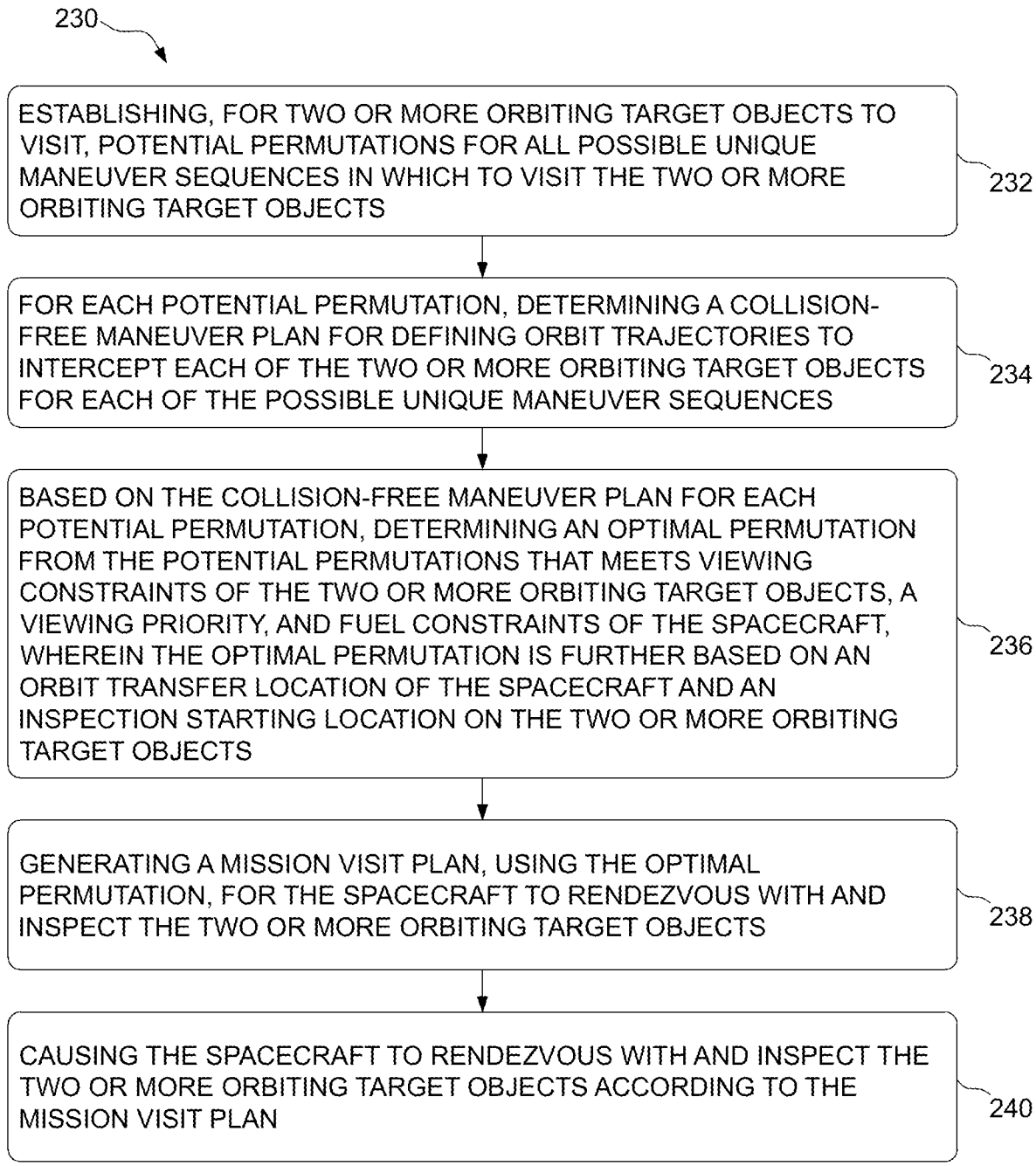
FIG. 15 shows a flowchart of an example of a method executed by a controller onboard a spacecraft to generate a mission plan in real-time that guides the spacecraft along a space autonomous mission to rendezvous with two or more orbiting target objects, according to an example implementation.

FIG. 15 shows a flowchart of an example of a method 230 executed by a controller onboard a spacecraft to generate a mission plan in real-time that guides the spacecraft along a space autonomous mission to rendezvous with two or more orbiting target objects, according to an example implementation. Method 230 shown in FIG. 15 presents an example of a method that could be used with the system 180 shown in FIG. 13, or with the mission controller 188 shown in FIG. 14, for example. Further, devices or systems may be used or configured to perform logical functions presented in FIG. 15. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 230 may include one or more operations, functions, or actions as illustrated by one or more of blocks 232-240. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed in flowcharts herein, the flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long-term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

Thus, within examples, functions shown in the flowcharts of the description take the form of the instructions that are executable by the one or more processors to carryout and perform the functions.

In addition, each block or portions of each block in FIG. 15, and within other processes and methods or flowcharts disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 232, the method 230 includes establishing, for two or more orbiting target objects to visit, potential permutations for all possible unique maneuver sequences in which to visit the two or more orbiting target objects.

In one example, block 232 includes functions of utilizing a pathfinding algorithm for gaming for determining all potential permutations for all possible unique maneuver sequences in which to visit the two or more orbiting target objects. An example of the pathfinding algorithm for gaming is an A* algorithm, such as a searching algorithm that finds a shortest path between an initial and a final point.

At block 234, the method 230 includes for each potential permutation, determining a collision-free maneuver plan for defining orbit trajectories to intercept each of the two or more orbiting target objects for each of the possible unique maneuver sequences.

In one example, block 234 includes calculating a transfer orbit relative intercept location based on current expected spacecraft and target object positions, velocities, and orbital parameters.

At block 236, the method 230 includes based on the collision-free maneuver plan for each potential permutation, determining an optimal permutation from the potential permutations that meets viewing constraints of the two or more orbiting target objects, a viewing priority, and fuel constraints of the spacecraft. The optimal permutation is further based on an orbit transfer location of the spacecraft and an inspection starting location on the two or more orbiting target objects.

In one example, block 236 includes ranking each potential permutation based on intercept success of the two or more orbiting targets, the viewing priority, and remaining fuel of the spacecraft, and selecting the optimal permutation from the potential permutations to be a potential permutation that has no rendezvous intercept failures and has a highest fuel remaining on the spacecraft.

In one example, block 236 includes ranking each potential permutation based on solar point constraints or sun exclusion zones, and selecting the optimal permutation from the potential permutations to be a potential permutation that meets the solar point constraints and has a highest fuel remaining on the spacecraft.

In another example, block 236 includes ranking each potential permutation based on orbit trajectory limitations due to a point of closest approach, and selecting the optimal permutation from the potential permutations to be a potential permutation that meets the orbit trajectory limitations and has a highest fuel remaining on the spacecraft.

At block 238, the method 230 includes generating a mission visit plan, using the optimal permutation, for the spacecraft to rendezvous with and inspect the two or more orbiting target objects.

At block 240, the method 230 includes causing the spacecraft to rendezvous with and inspect the two or more orbiting target objects according to the mission visit plan.

In one example, the method 230 further includes after causing the spacecraft to begin the mission visit plan, receiving an update to at least one of a location of the two or more orbiting target objects and a spacecraft collision possibility, and then based on the update to the at least one of the location of the two or more orbiting target objects and the spacecraft collision possibility, reevaluating an ability to execute the mission visit plan according to specified mission maneuvers, number and type of target observations, and available time to accomplish target encounters. Following, based on constraints of meeting the specified mission maneuvers, the mission visit plan is updated to modify an inspection time per target.

In another example, the method 230 further includes after causing the spacecraft to begin the mission visit plan, updating position and velocity status on each of the two or more orbiting target objects and checking for a possible collision event with the spacecraft, and based on updates to the position and velocity on each of the two or more orbiting target objects, updating the mission visit plan by performing one or more of modifying an orbit transfer time of the spacecraft, modifying wait times to rendezvous or perform inspection, or modifying a maneuver trajectory of the spacecraft.

In still another example, for each of the two or more orbiting target objects, multiple inspection points exist, and the method 230 further includes establishing the potential permutations for all possible unique sequences in which to visit the two or more orbiting target objects to include permutations for at least two or more inspection points on each target object.

Figure 16:
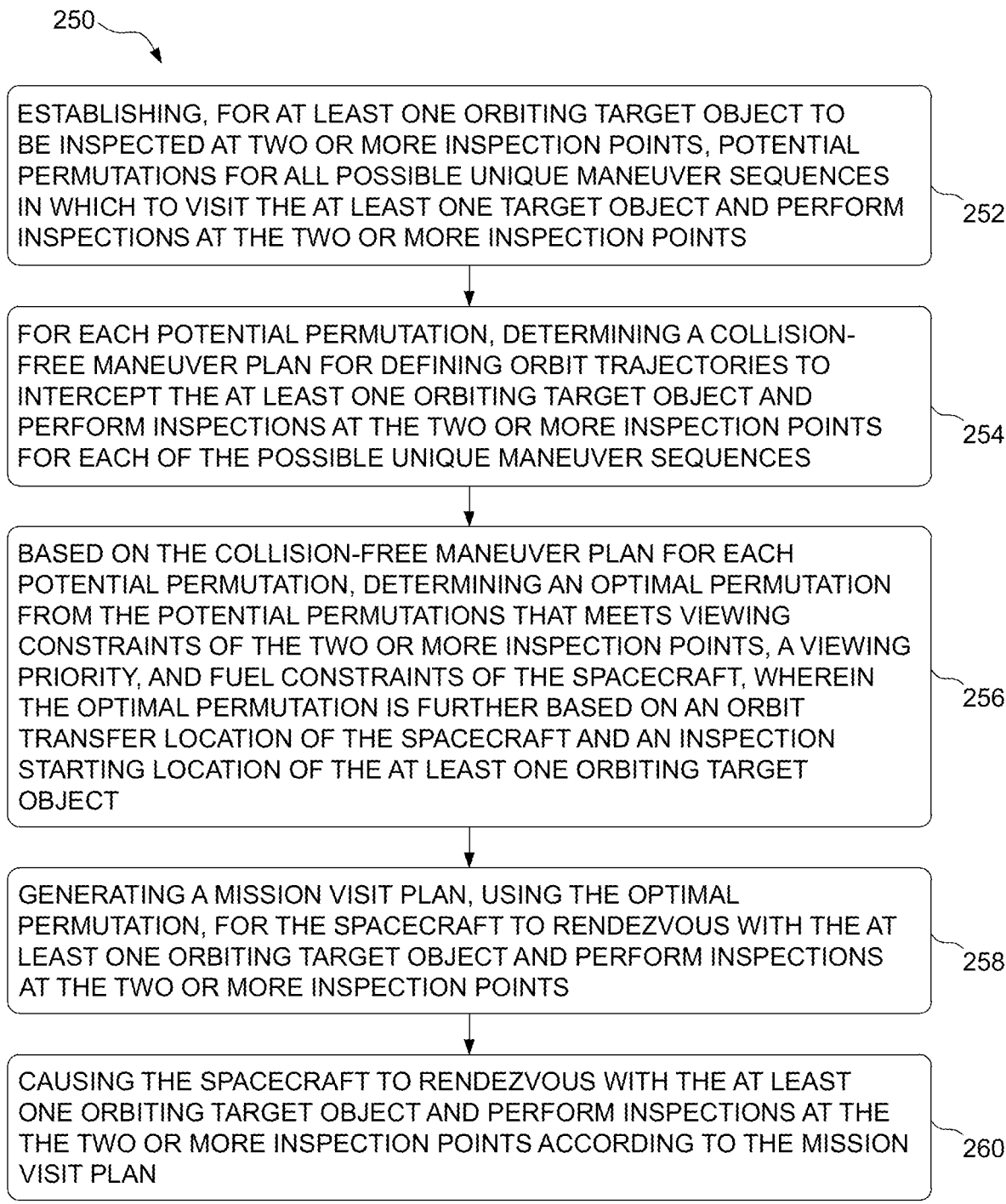
FIG. 16 shows a flowchart of an example of another method executed by a controller onboard a spacecraft to generate a mission plan in real-time that guides the spacecraft along a space autonomous mission to rendezvous with two or more orbiting target objects, according to an example implementation.

FIG. 16 shows a flowchart of an example of another method 250 executed by a controller onboard a spacecraft to generate a mission plan in real-time that guides the spacecraft along a space autonomous mission to rendezvous with two or more orbiting target objects, according to an example implementation. Method 250 shown in FIG. 16 presents an example of a method that could be used with the system 180 shown in FIG. 13, or with the mission controller 188 shown in FIG. 14, for example.

At block 252, the method 250 includes establishing, for at least one orbiting target object to be inspected at two or more inspection points, potential permutations for all possible unique maneuver sequences in which to visit the at least one target object and perform inspections at the two or more inspection points. In one example, the at least one orbiting target object has the two or more inspection points, each of which requires a different orbital approach trajectory by the spacecraft for visiting, and the different orbital approach trajectories depends on an order in which the two or more inspection points are visited.

At block 254, the method 250 includes for each potential permutation, determining a collision-free maneuver plan for defining orbit trajectories to intercept the at least one orbiting target object and perform inspections at the two or more inspection points for each of the possible unique maneuver sequences.

In one example, block 254 includes based on a unique maneuver sequence within a potential permutation that violates the viewing constraints of the two or more inspection points, the viewing priority, or the fuel constraints of the spacecraft, backtracking to a previous inspection point in the unique maneuver sequence as a next inspection point in the unique maneuver sequence to consider.

In another example, block 254 includes based on a specific inspection point in a unique maneuver sequence not being viable, removing all subsequent permutations from further consideration.

In still another example, block 254 includes calculating a transfer orbit relative intercept location based on current expected spacecraft and target object positions, velocities, and orbital parameters.

At block 256, the method 250 includes based on the collision-free maneuver plan for each potential permutation, determining an optimal permutation from the potential permutations that meets viewing constraints of the two or more inspection points, a viewing priority, and fuel constraints of the spacecraft. The optimal permutation is further based on an orbit transfer location of the spacecraft and an inspection starting location of the at least one orbiting target object.

In one example, block 256 includes ranking each potential permutation based on intercept success of the two or more inspection points, the viewing priority, and remaining fuel of the spacecraft, and selecting the optimal permutation from the potential permutations to be a potential permutation that has no rendezvous intercept failures and has a highest fuel remaining on the spacecraft.

In another example, block 256 includes ranking each potential permutation based on solar point constraints or sun exclusion zones, and selecting the optimal permutation from the potential permutations to be a potential permutation that meets the solar point constraints and has a highest fuel remaining on the spacecraft.

In still another example, block 256 includes ranking each potential permutation based on orbit trajectory limitations due to a point of closest approach, and selecting the optimal permutation from the potential permutations to be a potential permutation that meets the orbit trajectory limitations and has a highest fuel remaining on the spacecraft.

At block 258, the method 250 includes generating a mission visit plan, using the optimal permutation, for the spacecraft to rendezvous with the at least one orbiting target object and perform inspections at the two or more inspection points.

At block 260, the method 250 includes causing the spacecraft to rendezvous with the at least one orbiting target object and perform inspections at the two or more inspection points according to the mission visit plan.

In one example, the method 250 further includes after causing the spacecraft to begin the mission visit plan, receiving an update to at least one of a location of the at least one orbiting target object and a spacecraft collision possibility, and based on the update to the at least one of the location of the at least one orbiting target object and the spacecraft collision possibility, reevaluating an ability to execute the mission visit plan according to specified mission maneuvers, number and type of target observations, and available time to accomplish target encounters. Following, based on constraints of meeting the specified mission maneuvers, the mission visit plan is updated to modify an inspection time per target.

In summary, example methods and systems described herein use game based A* search techniques to address autonomous space missions. Methods are described that account for variations in visits to a set of targets and determine a best fuel saving, collision free target visitation sequence that satisfies mission constraints and the ever-changing target and other object environment. The methods consider all targets and all possible trajectory paths (e.g., all permutations) to evaluate for the mission constraints.

In addition, the methods consider real-time aspects and account for dynamic changes in real-time (e.g., perhaps a thruster on the spacecraft was instructed to fire for 2.9 seconds but instead operated for 3 seconds, and now the mission plan must adapt). Thus, all possible permutations and maneuvers for trajectories for permutations are determined, from which those that might violate constraints are discarded, in order to determine which of remaining options are most efficient or meet most criteria to develop a mission plan with all approaches/orbital transfer plans. While performing the analysis, variables may change in real-time, and thus, all possible targets to visit need to be reassessed.

By the term "substantially" and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method executed by a controller onboard a spacecraft to generate a mission plan in real-time that guides the spacecraft along a space autonomous mission to rendezvous with two or more orbiting target objects, the method comprising:
   establishing, for two or more orbiting target objects to visit, potential permutations for all possible unique maneuver sequences in which to visit the two or more orbiting target objects;
   for each potential permutation, determining a collision-free maneuver plan for defining orbit trajectories to intercept each of the two or more orbiting target objects for each of the possible unique maneuver sequences;
   based on the collision-free maneuver plan for each potential permutation, determining an optimal permutation from the potential permutations that meets viewing constraints of the two or more orbiting target objects, a viewing priority, and fuel constraints of the spacecraft, wherein the optimal permutation is further based on an orbit transfer location of the spacecraft and an inspection starting location on the two or more orbiting target objects;
   generating a mission visit plan, using the optimal permutation, for the spacecraft to rendezvous with and inspect the two or more orbiting target objects; and
   causing the spacecraft to rendezvous with and inspect the two or more orbiting target objects according to the mission visit plan.

2. The method of claim 1, wherein establishing potential permutations for all possible unique maneuver sequences in which to visit the two or more orbiting target objects comprises:
   utilizing a pathfinding algorithm for gaming for determining all potential permutations for all possible unique maneuver sequences in which to visit the two or more orbiting target objects.

3. The method of claim 2, wherein the pathfinding algorithm for gaming is an A* algorithm.

4. The method of claim 1, wherein determining the collision-free maneuver plan for each of the possible unique maneuver sequences comprises:
   calculating a transfer orbit relative intercept location based on current expected spacecraft and target object positions, velocities, and orbital parameters.

5. The method of claim 1, wherein determining the optimal permutation from the potential permutations comprises:
   ranking each potential permutation based on intercept success of the two or more orbiting targets, the viewing priority, and remaining fuel of the spacecraft; and
   selecting the optimal permutation from the potential permutations to be a potential permutation that has no rendezvous intercept failures and has a highest fuel remaining on the spacecraft.

6. The method of claim 1, wherein determining the optimal permutation from the potential permutations comprises:
   ranking each potential permutation based on solar point constraints or sun exclusion zones; and
   selecting the optimal permutation from the potential permutations to be a potential permutation that meets the solar point constraints and has a highest fuel remaining on the spacecraft.

7. The method of claim 1, wherein determining the optimal permutation from the potential permutations comprises:
   ranking each potential permutation based on orbit trajectory limitations due to a point of closest approach; and
   selecting the optimal permutation from the potential permutations to be a potential permutation that meets the orbit trajectory limitations and has a highest fuel remaining on the spacecraft.

8. The method of claim 1, further comprising:
   after causing the spacecraft to begin the mission visit plan, receiving an update to at least one of a location of the two or more orbiting target objects and a spacecraft collision possibility;
   based on the update to the at least one of the location of the two or more orbiting target objects and the spacecraft collision possibility, reevaluating an ability to execute the mission visit plan according to specified mission maneuvers, number and type of target observations, and available time to accomplish target encounters; and
   based on constraints of meeting the specified mission maneuvers, updating the mission visit plan to modify an inspection time per target.

9. The method of claim 1, further comprising:
   after causing the spacecraft to begin the mission visit plan, updating position and velocity status on each of the two or more orbiting target objects and checking for a possible collision event with the spacecraft; and
   based on updates to the position and velocity on each of the two or more orbiting target objects, updating the mission visit plan by performing one or more of modifying an orbit transfer time of the spacecraft, modifying wait times to rendezvous or perform inspection, or modifying a maneuver trajectory of the spacecraft.

10. The method of claim 1, wherein for each of the two or more orbiting target objects, multiple inspection points exist, and the method further comprises:
    establishing the potential permutations for all possible unique sequences in which to visit the two or more orbiting target objects to include permutations for at least two or more inspection points on each target object.

11. A method executed by a controller onboard a spacecraft to generate a mission plan in real-time that guides the spacecraft along a space autonomous mission to rendezvous with at least one orbiting target object, the method comprising:
    establishing, for at least one orbiting target object to be inspected at two or more inspection points, potential permutations for all possible unique maneuver sequences in which to visit the at least one orbiting target object and perform inspections at the two or more inspection points;

for each potential permutation, determining a collision-free maneuver plan for defining orbit trajectories to intercept the at least one orbiting target object and perform inspections at the two or more inspection points for each of the possible unique maneuver sequences;

based on the collision-free maneuver plan for each potential permutation, determining an optimal permutation from the potential permutations that meets viewing constraints of the two or more inspection points, a viewing priority, and fuel constraints of the spacecraft, wherein the optimal permutation is further based on an orbit transfer location of the spacecraft and an inspection starting location of the at least one orbiting target object;

generating a mission visit plan, using the optimal permutation, for the spacecraft to rendezvous with the at least one orbiting target object and perform inspections at the two or more inspection points; and causing the spacecraft to rendezvous with the at least one orbiting target object and perform inspections at the two or more inspection points according to the mission visit plan.

12. The method of claim 11, wherein:
the at least one orbiting target object has the two or more inspection points, each of which requires a different orbital approach trajectory by the spacecraft for visiting; and
the different orbital approach trajectory depends on an order in which the two or more inspection points are visited.

13. The method of claim 11, wherein determining the collision-free maneuver plan for each of the possible unique maneuver sequences comprises:
based on a unique maneuver sequence within a potential permutation that violates the viewing constraints of the two or more inspection points, the viewing priority, or the fuel constraints of the spacecraft, backtracking to a previous inspection point in the unique maneuver sequence as a next inspection point in the unique maneuver sequence to consider.

14. The method of claim 11, wherein determining the collision-free maneuver plan for each of the possible unique maneuver sequences comprises:
based on a specific inspection point in a unique maneuver sequence not being viable, removing all subsequent permutations from further consideration.

15. The method of claim 11, wherein determining the collision-free maneuver plan for each of the possible unique maneuver sequences comprises:
calculating a transfer orbit relative intercept location based on current expected spacecraft and target object positions, velocities, and orbital parameters.

16. The method of claim 11, wherein determining the optimal permutation from the potential permutations comprises:
ranking each potential permutation based on intercept success of the two or more inspection points, the viewing priority, and remaining fuel of the spacecraft; and
selecting the optimal permutation from the potential permutations to be a potential permutation that has no rendezvous intercept failures and has a highest fuel remaining on the spacecraft.

17. The method of claim 11, wherein determining the optimal permutation from the potential permutations comprises:
ranking each potential permutation based on solar point constraints or sun exclusion zones; and
selecting the optimal permutation from the potential permutations to be a potential permutation that meets the solar point constraints and has a highest fuel remaining on the spacecraft.

18. The method of claim 11, wherein determining the optimal permutation from the potential permutations comprises:
ranking each potential permutation based on orbit trajectory limitations due to a point of closest approach; and
selecting the optimal permutation from the potential permutations to be a potential permutation that meets the orbit trajectory limitations and has a highest fuel remaining on the spacecraft.

19. The method of claim 11, further comprising:
after causing the spacecraft to begin the mission visit plan, receiving an update to at least one of a location of the at least one orbiting target object and a spacecraft collision possibility;
based on the update to the at least one of the location of the at least one orbiting target object and the spacecraft collision possibility, reevaluating an ability to execute the mission visit plan according to specified mission maneuvers, number and type of target observations, and available time to accomplish target encounters; and
based on constraints of meeting the specified mission maneuvers, updating the mission visit plan to modify an inspection time per target.

20. An onboard mission controller for a spacecraft, comprising:
a processor; and
non-transitory computer-readable media having stored therein instructions, which when executed by the processor, cause the spacecraft to perform functions comprising:
establishing, for two or more orbiting target objects to visit, potential permutations for all possible unique maneuver sequences in which to visit the two or more orbiting target objects;
for each potential permutation, determining a collision-free maneuver plan for defining orbit trajectories to intercept each of the two or more orbiting target objects for each of the possible unique maneuver sequences;
based on the collision-free maneuver plan for each potential permutation, determining an optimal permutation from the potential permutations that meets viewing constraints of the two or more orbiting target objects, a viewing priority, and fuel constraints of the spacecraft, wherein the optimal permutation is further based on an orbit transfer location of the spacecraft and an inspection starting location on the two or more orbiting target objects;
generating a mission visit plan, using the optimal permutation, for the spacecraft to rendezvous with and inspect the two or more orbiting target objects; and
causing the spacecraft to rendezvous with and inspect the two or more orbiting target objects according to the mission visit plan.

* * * * *